United States Patent [19]

Stevens

[11] Patent Number: 4,582,990

[45] Date of Patent: Apr. 15, 1986

[54] ANALYTICAL INSTRUMENT WITH TWO MOVING TRAINS OF SAMPLE HOLDER-CARRYING TRAYS UNDER MICROPROCESSOR CONTROL

[75] Inventor: William M. Stevens, Loveland, Ohio

[73] Assignee: Randam Electronics, Inc., Cincinnati, Ohio

[21] Appl. No.: 200,895

[22] Filed: Oct. 27, 1980

[51] Int. Cl.$^4$ .......................... G01T 7/00; G01T 7/08
[52] U.S. Cl. .................. 250/328; 250/252.1; 414/416; 422/65; 422/67
[58] Field of Search .................. 422/63, 65, 67, 71; 414/730, 416, 417, 753; 198/472; 206/459; 250/328, 252; 364/571, 579; 436/48; 356/244

[56] References Cited

U.S. PATENT DOCUMENTS

| | | | |
|---|---|---|---|
| 2,701,635 | 2/1955 | Mills | 206/459 |
| 2,820,905 | 1/1958 | Schloss | 250/252.1 |
| 2,998,527 | 8/1961 | Shevick et al. | 250/496.1 |
| 3,449,566 | 6/1969 | Kolb et al. | 250/252 |
| 3,722,719 | 3/1973 | Frank | 250/328 |
| 3,749,916 | 7/1973 | Thomas et al. | 250/328 |
| 3,911,274 | 10/1975 | Roos et al. | 250/328 |
| 3,923,463 | 12/1975 | Bagshawe et al. | 250/328 |
| 3,934,702 | 1/1976 | Snyder et al. | 414/730 |
| 3,999,866 | 12/1976 | Mathisen | 356/244 |
| 4,040,747 | 8/1977 | Webster | 356/418 |
| 4,158,545 | 6/1979 | Yamashita et al. | 422/67 |
| 4,200,933 | 4/1980 | Nickel et al. | 364/571 |
| 4,204,430 | 5/1980 | Tamm et al. | 73/1 R |
| 4,240,848 | 12/1980 | Barber | 156/64 |
| 4,259,290 | 3/1981 | Suovaniemi et al. | 422/67 |
| 4,331,026 | 5/1982 | Howard et al. | 364/571 |

FOREIGN PATENT DOCUMENTS 145130 11/1980 Fed. Rep. of Germany ........ 422/65

OTHER PUBLICATIONS

Gould, "Laboratory-Based Administrative Computer Monitoring System", *Automation in Analytical Chemistry*, vol. 1, Mediad Inc., White Plains, N.Y., 1967, pp. 378-382.

Heier, "Technilogger II: A Data Acquisition and Report Presentation System", *Advances in Automated Analysis*, vol. 1, Mediad Inc., White Plains, N.Y., 1970, pp. 85-87.

Whitehead, "The Auto Analyzer Sampler T-40", *Automation in Analytical Chemistry*, vol. 1, Mediad Inc., White Plains, N.Y., 1966, pp. 364-367.

*Primary Examiner*—Alfred E. Smith
*Assistant Examiner*—Carolyn E. Fields
*Attorney, Agent, or Firm*—Eugene F. Friedman

[57] ABSTRACT

A gamma counter linearly moving two rows of linked trays each having a two-dimensional array of sample tubes. A noncantilevered crane plucks each of the tubes and carries them to the counting well. A coupling mechanism between trays allows the operator to add further trays while the instrument performs analyses on previously added sample tubes. A microprocessor in the instrument allows the operator to place into memory information for the assay contemporaneously with the addition of the new trays. Tabs on the tray interrupt photosensors on the instrument associated with the two channels of trays to properly stop the trays where the fingers on the crane can reach the rows of tubes. The fingers on the crane, when descending to grip a tube, do so off to the side of the tray to avoid contacting and possibly damaging the tops of the tubes. An internal standard of Iodine$^{129}$ provides gamma particles and acts as a known sample. A microprocessor within the instrument requires a calibration whenever the power to the instrument is turned on and at a preset time of each day. Additionally, the instrument's microcomputer stores management and service data relating to the quality and the patterns of the instrument's use.

103 Claims, 21 Drawing Figures

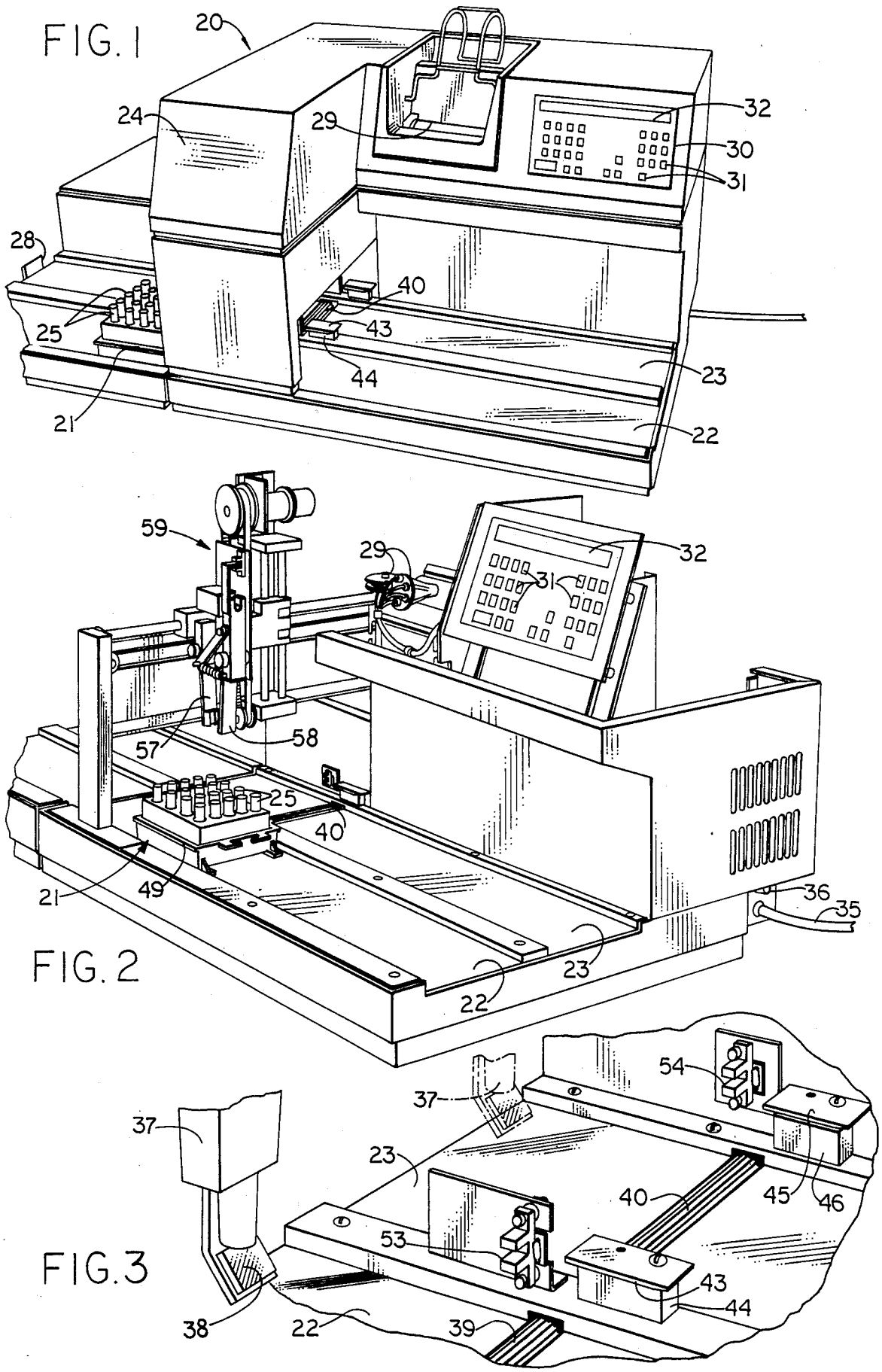

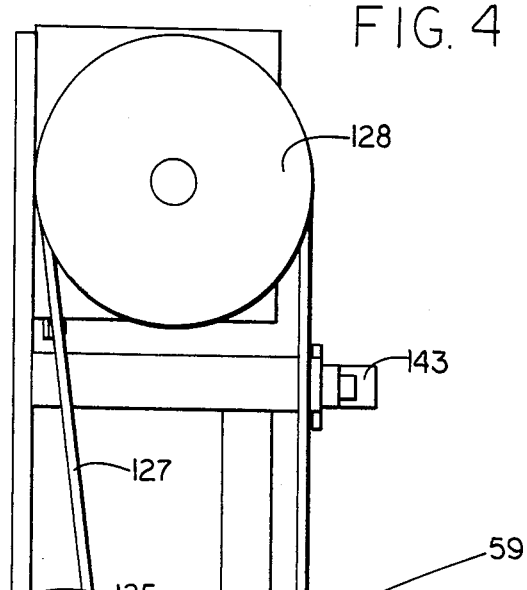
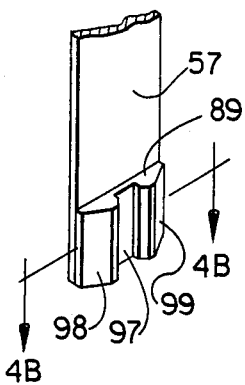
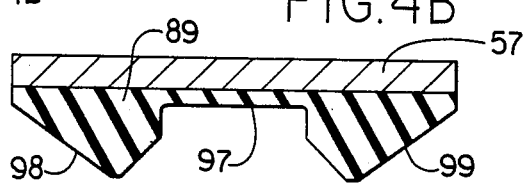
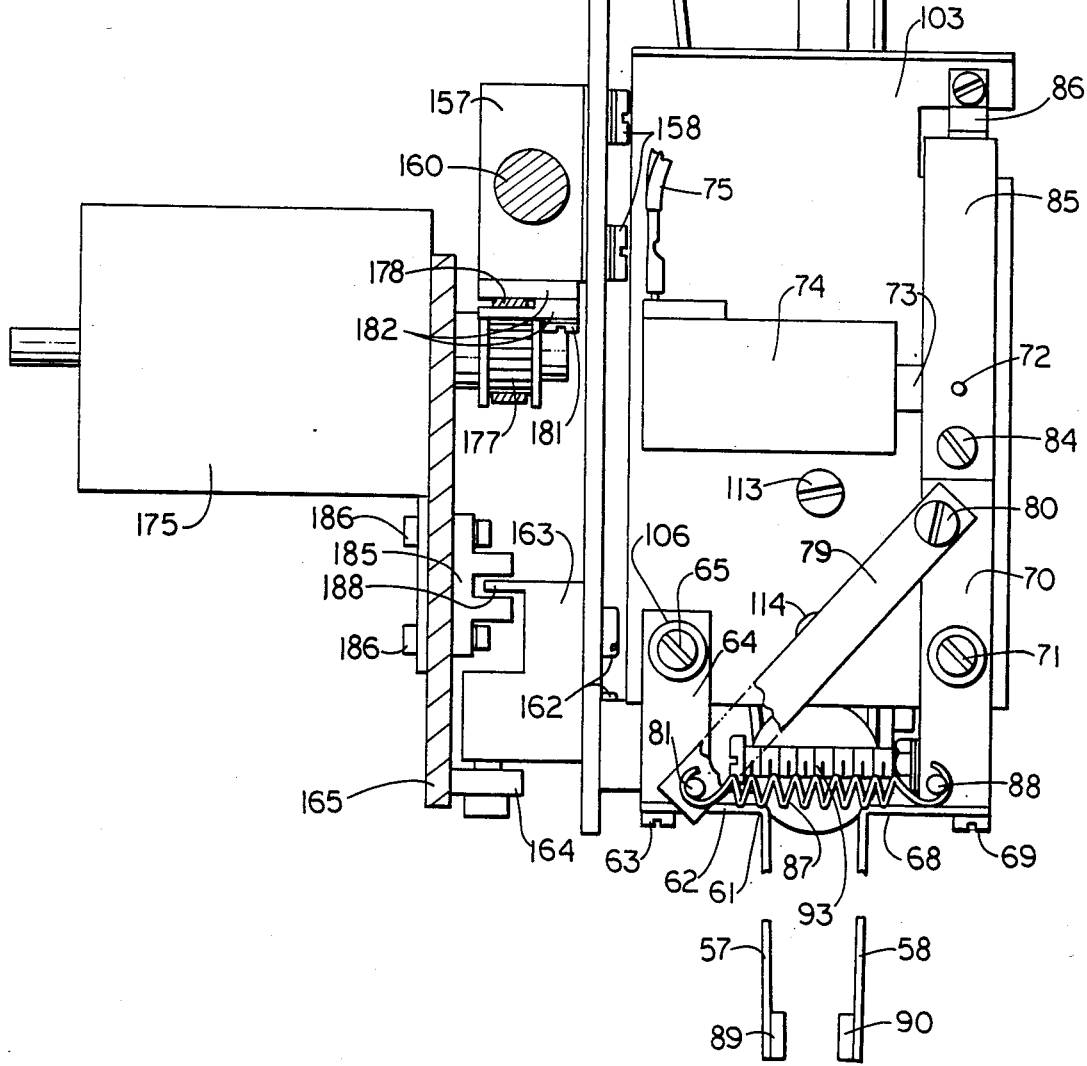

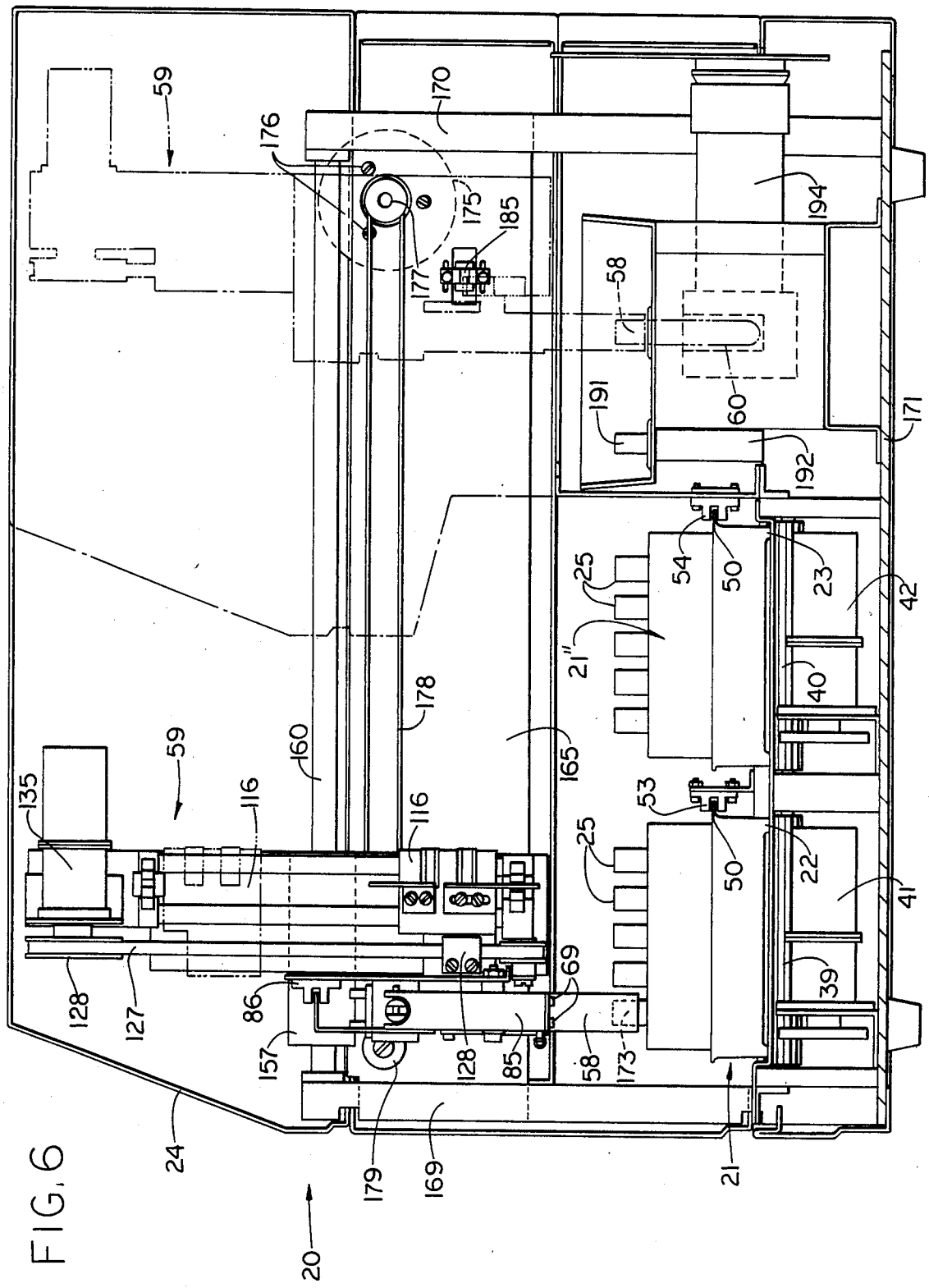

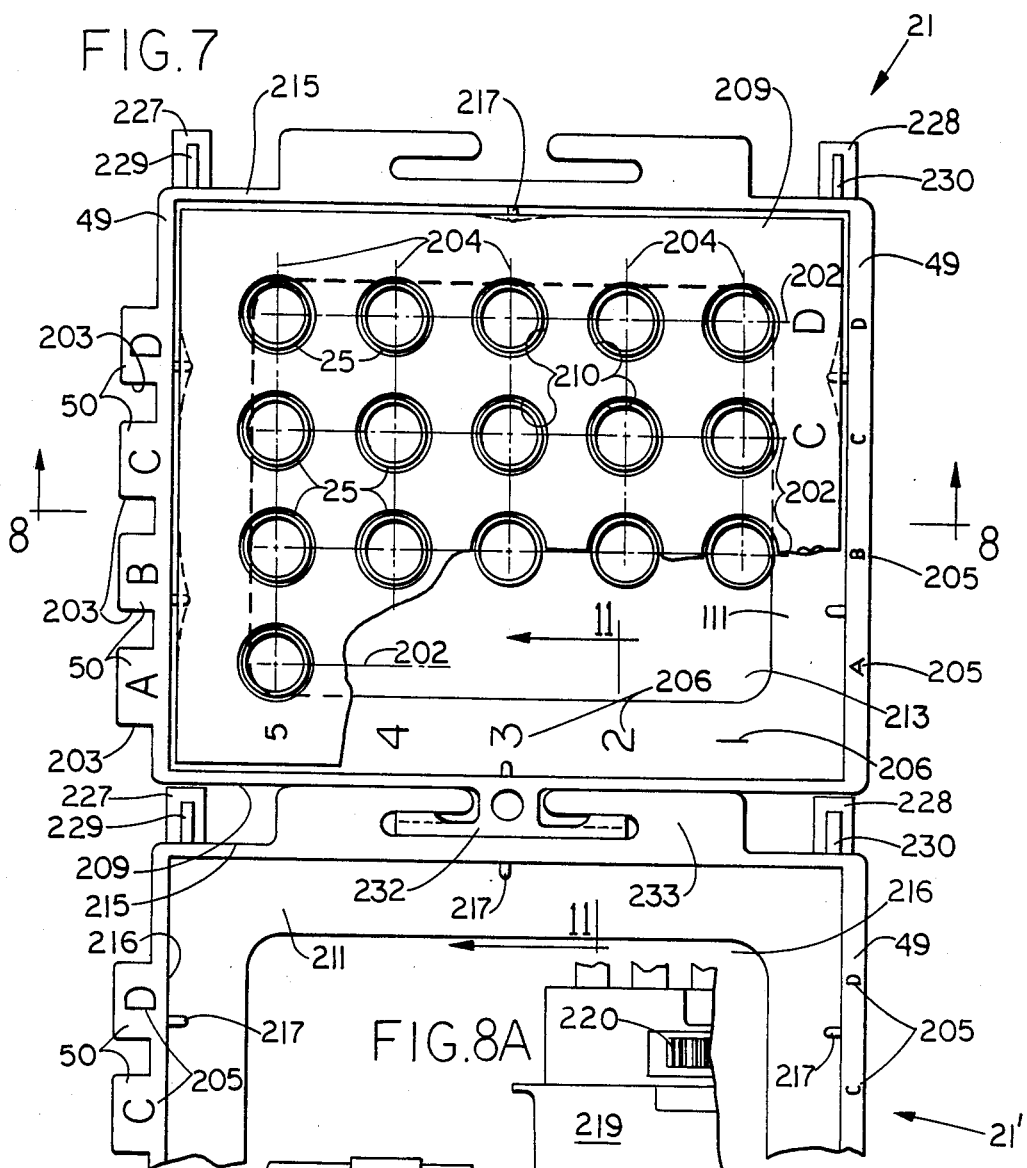

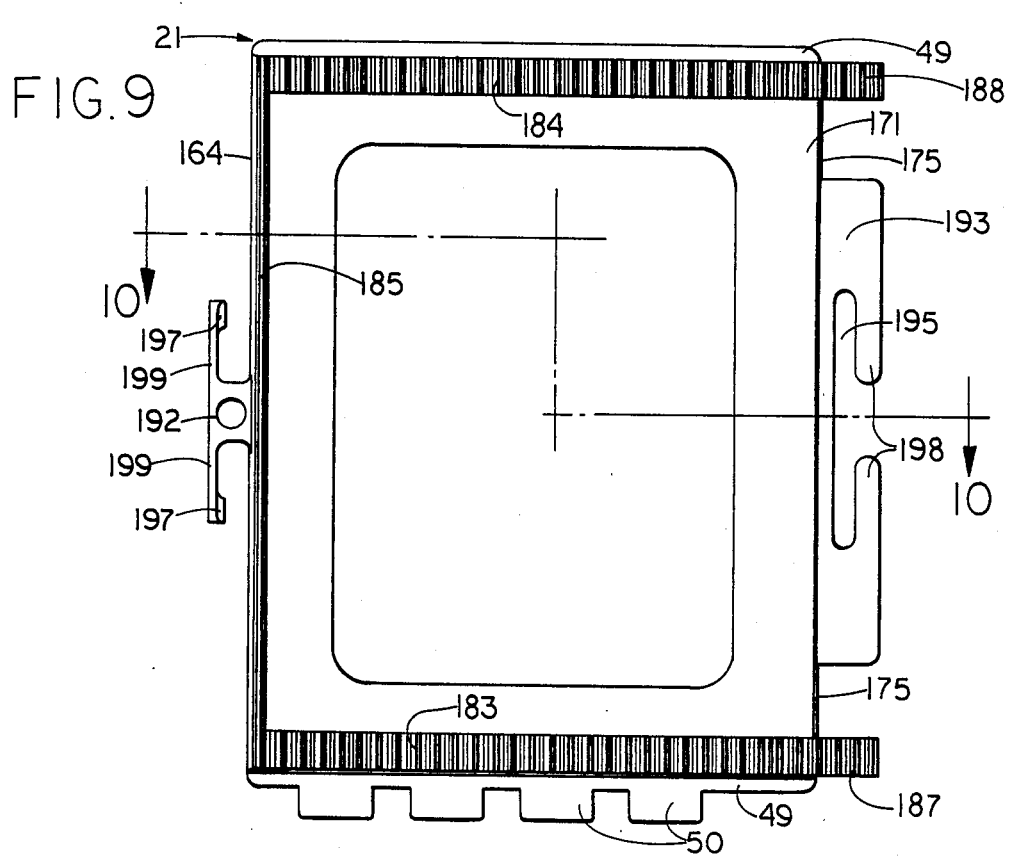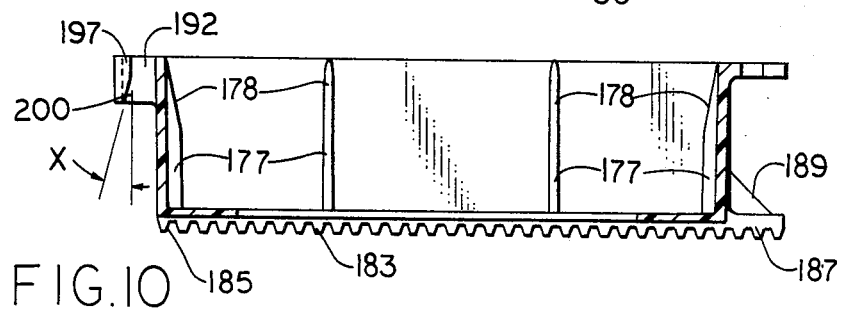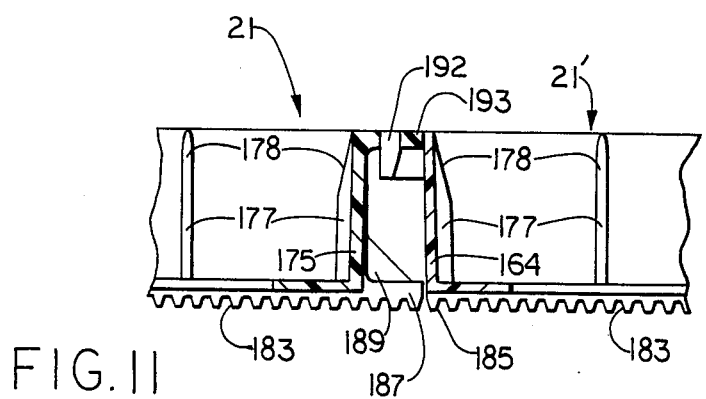

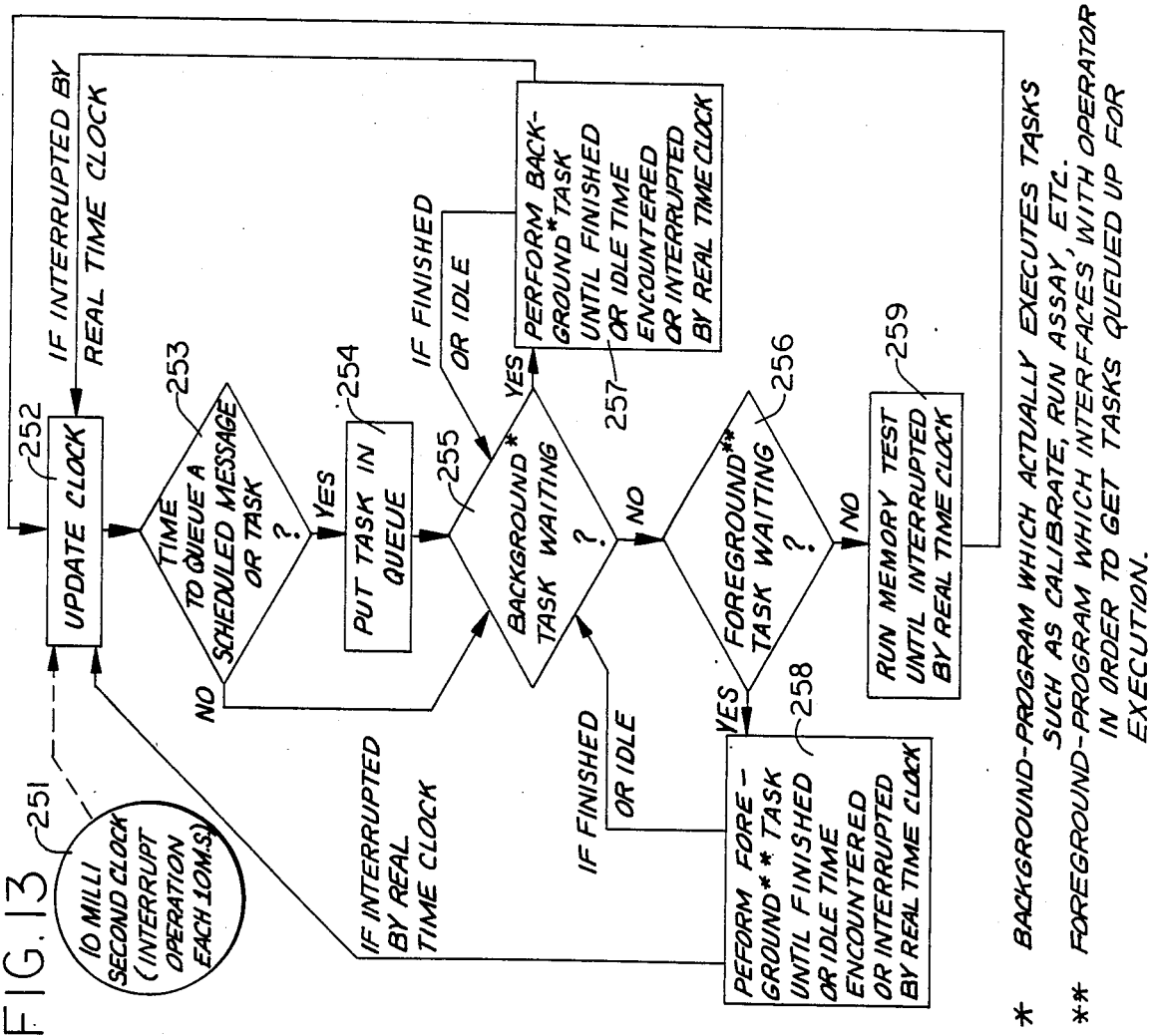

ANALYTICAL INSTRUMENT WITH TWO MOVING TRAINS OF SAMPLE HOLDER-CARRYING TRAYS UNDER MICROPROCESSOR CONTROL

CROSS REFERENCE TO RELATED APPLICATIONS

The present application relates to the U.S. utility patent applications "Calibration with Double-Pass Measurements and Computational Peak Finding" by William E. Atkinson, William J. Dirr, and William M. Stevens, Ser. No. 200,887, filed Oct. 27, 1980, (now U.S. Pat. No. 4,403,145), and "Linkable Sample-Tube Carrying Tray with Tabs and Gears" by William M. Stevens and Eugene L. Timperman, Ser. No. 201,190, filed Oct. 27, 1980, (now Pat. No. 4,403,687), and the design patent application "Carrying Tray for Sample Tubes" by William M. Stevens and Eugene L. Timperman, Ser. No. 200,889, filed Oct. 27, 1980, now abandoned. The present application has the same filing date as the cited applications and incorporates their disclosures.

BACKGROUND

Analytical instruments have found use in modern laboratories for performing a large number of routine analyses. Accordingly, such instruments require the handling and processing of a large number of samples during a day of typical use. Quite often, the samples assume a liquid form. Accordingly, they and their containers must receive careful handling in order to avoid the loss of the samples themselves and the possible contamination of their surrounding environs. The latter becomes a particularly egregious problem where the sample contains radioactive or infectious material.

An operator's manual insertion of a sample tube into an instrument immediately prior to its analysis and its removal immediately afterwards has proven very inefficient. Initially, it requires the constant and total attention of the operator. The expenditure for such an individual immediately imposes a heavy economic burden upon the running of each assay.

Furthermore, the operator simply cannot replace an assayed sample with an unknown sample in the instrument with much speed. Consequently, the efficiency of the instrument, which must sit idle while waiting for the next sample, suffers further.

Additionally, replacing sample tubes in the instrument represents a boring, unchallenging task. As a result, the operator may not devote his full attention to its proper performance. Consequently, the very nature of the effort required of the operator may lead to its incorrect performance with concomitant inaccurate and possibly seriously deleterious results.

Thus, many instruments have undertaken to automatically handle a multitude of sample holders in addition to their normal more usual performance of particular analyses upon the samples. Some of these sample-changing instruments attempt to handle a number of sample holders placed individually into a retaining device. The device then subsequently moves the individual samples to the instrument's detector. These instruments which accept only individual sample tubes have only limited capacity. They also continue to require substantial attention because of the necessity of handling each of the sample tubes going into the instrument. Lastly, they incorporate complicated mechanisms for receiving, holding, and moving the individual sample tubes.

U.S. Pat. Nos. 3,187,182 to J. Fratantuno; 3,270,202 to M. J. Long et al.; 3,348,658 to R. E. Cannon; and 3,355,454 to R. E. Olson et al. provide examples of such instruments requiring the individual insertion of tubes into a sample changer. In each of these patents, the tubes follow a convoluted, circuitous path across the surface of the tray to reach the detector. The twisted, contorted path provides a greater capacity to the instrument's surface.

This type of device further requires a type of chain device providing holders for the individual tubes. The motion of the chain provides the power to move the tubes. An operator catching his finger in the train could suffer serious personal injury. Alternatively, the tray may avoid the chain drive, but rather require a surface completely full of tubes. This latter alternative restricts the instrument's flexibility.

L. E. Packard et al., in their U.S. Pat. No. 2,924,718, and L. R. Heiss in his U.S. Pat. No. 3,322,958, show devices in which the sample tubes occupy positions in the periphery of a wheel. As the wheel moves, it either brings the tubes to a position where a carrier may move it to the detector, as in the former, or to the detector itself, as in the latter. However, permitting only a circle of the sample tubes severely limits the capacity of the instrument.

In an effort to achieve greater efficiency, other instruments have attempted to receive and operate upon trays each carrying a multitude of sample holders. However, the instrument becomes limited by the necessity of determining the position of the sample tubes within the trays themselves. Thus, they must first achieve relative motion between the detector in the instrument and the trays. They must also properly locate the sample tubes relative to the exterior configuration of the trays.

The sample trays in these instruments remain totally passive. They do not assist the instrument in the proper location of the tubes relative to the detector. As a result, the instruments must incorporate sufficient and sufficiently sophisticated components to bring the sample tubes and the detector together.

Furthermore, the trays for a particular instrument can possess very little degree of variability from each other. Any change in their configuration will very likely confuse the instrument and hinder, if not absolutely prevent, the proper handling of the sample tubes inside the tray.

As examples of instruments using such sample trays, the U.S. Pat. Nos. 3,062,764 to W. W. Allen et al.; 3,859,528 to S. H. Luitwieler, Jr., et al.; and 4,040,533 to W. J. De Boer all show sample trays having a one-dimensional array of tubes. The instrument attempts to move the trays along various paths on the top of a flat table in order to bring the sample tubes to the detector.

O. G. H. Junger et al., in U.S. Pat. No. 3,327,833, goes a step further and provides a mechanism moving such sample trays vertically as well as horizontaly. As with the prior patents, the trays all have the same configuration in order to permit the instrument to handle them properly.

L. E. Packard et al., in their U.S. Pat. No. 3,257,561, show instruments incorporating circular trays having sample tubes at their periphery. The patent then discloses an extremely complex mechanism for shifting each tray from one stack of unanalyzed samples to another stack after the testing procedure.

Further, U.S. Pat. Nos. 3,855,473 to J. E. Burgess et al. and 3,911,274 to C. J. Roos et al. show instruments utilizing trays with two-dimensional arrays of sample tubes. However, the trays remain motionless and require the detector, in both instruments, to have two degrees of freedom of motion in order to find the sample tubes. The trays in the former of the two patents have absolute regularity for this purpose. In the latter case, the operator may place strips of light sources on the instrument itself to help it find the tubes within the trays.

U. S. Hof et al.'s U.S. Pat. No. 3,654,472 places trays with two-dimensional arrays of tubes on carriers in a "Ferris wheel" arrangement. The instrument must not only move the trays around the circuit, but it must also move each tray out of its carrier past a detector. Again, the passive nature of the tray requires that they all be the same in order that the instrument may handle them properly.

In U.S. Pat. No. 3,722,719 to E. Frank appears an instrument which moves trays having a two-dimensional array of tubes linearly past a carriage station. At the station, the entire row of tubes enters the carriage which transports them together to the detector. Again, for predictability, the trays all resemble each other and must fit within a particular carrier which provides them with their mode of power.

SUMMARY

Initially, an efficient automated instrument must possess a large capacity of sample tubes upon which it can operate. An improved sample-changing device for such an instrument includes a carrier holding a two-dimensional array of a plurality of sample holders for tubes. The array should maintain these tubes in a plane. A conveying device on the instrument then moves the carrier along a path in a predetermined first direction which lies in the plane with the tubes. The conveyor must move the carrier so that all of the sample holders pass between two predetermined points. When lying between the points, as discussed below, the instrument can move the sample holders to the detector.

Further, the carrier, when moved by the instrument, must remain separated from the detector by a nonzero predetermined distance in the same plane. This prevents the sample holders within the carrier from interfering with the analysis underway at the detector.

Lastly, the instrument must also include a motive means which forms no part of the conveyor. This last component transfers sample holders having a location between the two points mentioned above and lying in the same plane to the detector. The motive means moves a sample tube in a second direction from its location between the two points to the detector. This second direction, of course, cannot lie parallel to the direction in which the trays move. Otherwise, the detector would lie in the path of the carriers. Rather, the motive device moves each of the tubes away from the carrier in a direction having a component of motion perpendicular to the path that the instrument moves the carrier tray.

The greater the degree of freedom of the motive device moving the sample tubes, the greater becomes its liklihood of maladjustment or improper performance. Preferably, the motive device should simply have one degree of motion in the horizontal plane. Typically, it also has to lift or lower a tube from the carrier tray, preferably the former, to move it to the detector.

Accordingly, the conveyor must stop the motion of the carrier tray when located between the two points where the motive device can reach the tubes. The instrument achieves a large degree of flexibility if the carrier itself tells the instrument when to stop its motion. To do so, it should have a positioning device attached to it and formed of a plurality of components. These indicate the position of the sample holders in at least one direction. That direction, of course, represents the position along the path of motion where the sample holders sit.

The instrument must then have a sensing device which learns when the components of the positioning device on the carrier tray have reached a predetermined location relative to the detector. The instrument may then stop the carrier and undertake the tube's travel to the detector.

Conveniently, the positioning device on the tray may take the form of tabs extending outwardly from it. The instrument may then have opto-sensors which the tabs will interrupt when they reach their proper position.

The motive device which moves the tubes to the detector may take the form of an overhead crane with depending fingers which can actually grip a sample tube. The fingers, of course, must have an open configuration and at least one closed configuration in which they grip onto a tube. They furthermore must have a device which will close them around a sample tube and hold them closed to keep the sample tube retained between them.

When in their open configuration, the fingers have sufficient space between them to allow them to move along a row of sample tubes. In particular, the fingers travel on opposite sides of the sample tube. However, even when open, they remain sufficiently close to each other so as not to knock into tubes in adjacent rows. When they come to the desired tube, they stop, close, and grip the tube.

When the fingers grab a tube, they lift it from a first height at which they sit in the carrier to a second height entirely above and free of the tray. They then transport the sample tube to the detector for the analysis. Afterwards, the fingers return the sample holder to a location above its prior position in the sample tray. They then lower the tube back into its prior position.

The fingers must then open to release the sample tube. To obtain a further sample tube in the same row, the fingers, rather than raising or lowering, then move laterally to a position containing the next sample tube. This saves substantial time in the instrument's operation since the fingers need only execute a single short motion to reach the next tube.

Since the instrument has a transfer device for moving sample tubes, it may also include a standard sample having its own special holder within the instrument. The transfer device can move the standard sample to the detector which can thus automatically calibrate itself. In the instrument discussed above, the same fingers and crane find use in moving the standard sample to the detector.

Furthermore, the instrument may need to take account of the background radiation. It then subtracts the background count from subsequent measurements to avoid the introduction of any error from the former. To do this automatically, the instrument must know when no sample tube sits within the detector. It also has a self initiating device to commence the background count when it knows that the detector does not have a sample within it. Lastly, for an excessive background count, the instrument may include an alarm. The alarm, of course, provides to the operator a perceptible notice of an apparently excessive background count. The problem, for example, could have resulted from a spill from a sample tube.

To achieve fully automated operation, the instrument must have the ability to receive and process a large number of sample tubes. It must do so without the constant attention of the operator.

Accordingly, when the operator places samples in the instrument for analysis, he should then inform the instrument as to the desired procedures required for each sample. This becomes particularly important for an instrument that can perform a variety of different analyses upon submitted samples. In other words, the instrument must obtain and retain information as to the desired analysis for a sample at the time that the operator places the sample in the instrument; the operator should not have to wait until the instrument actually begins to analyze the particular sample tube.

To achieve the different analyses, the detector may have to assume a variety of different conditions. For example, in a gamma counter, the PM tube would have to receive several different high voltages to bring the desired peaks within the window set by a PHA. Furthermore, the detector would have to have a control device which actually places it in the required condition for a forthcoming assay. In addition, the calculator, coupled to the detector, processes the detector's signal and provides a meaningful output.

To operate automatically, the instrument will have a selecting device which allows the operator to manually choose the desired analysis. A memory coupled to the selecting device, the calculator, and the control device retain the information as to the desired analysis. When the instrument reaches a particular sample, the memory will possess the information needed to perform the assay.

Lastly, the automated operation results if the instrument responds to the information stored in the memory for the sample holders moved to the detector. The instrument must also cause the control device to place the detector in the appropriate condition for the particular analysis chosen for the sample. Further, the calculator must obtain the data from the physical measurement and provide a meaningful output as the result.

The memory may also store information about each of the analyses performed by the instrument. The instrument may then have an output device which displays this kind of stored information. Finally, an initiating device allows the owner or operator to recall the information thus stored. The stored information allows the monitoring of the instrument's performance as well as its use patterns.

BRIEF DESCRIPTION OF THE FIGURES

FIG. 1 gives a perspective view of a gamma counter processing sample tubes from two trains of coupled trays.

FIG. 2 provides an isometric view of the gamma counter of FIG. 1 with the cover removed to show both the conveyor mechanism for moving the trays and the transport-elevator mechanism for moving the sample tubes to the counting well.

FIG. 3 gives an enlarged view of the conveyor mechanism which moves the train of linked trays and the opto-sensor which determines where to stop the trays.

FIG. 4 shows the mechanism of the gripping fingers which hold a sample tube in suspension during its trip to and from the counting well.

FIG. 4a gives a front elevational view of a pad attached to each of the fingers for guiding, cushioning, and holding a sample tube.

FIG. 4b gives a cross-sectional view along the line 4b—4b of a finger with the holding pad shown in FIG. 4a.

FIG. 6 shows the transport mechanism which carries the tubes from the trays in both trains as well as the standard source to the counting well.

FIG. 7 gives a top plan view of two linked sample trays which can accept inserts holding a two-dimensional array of twenty sample tubes.

FIG. 8 gives a cross-sectional view along the line 8—8 of the sample tray of FIG. 7.

FIG. 8a shows a section of the front of a sample tray, rack insert, and machine readable code on the rack.

FIG. 9 gives a bottom plan view of the sample tray shown in FIGS. 7 and 8.

FIG. 10 provides a cross-sectional view along the broken line 10—10 of the carrier tray of FIG. 9.

FIG. 11 has a cross-sectional view along the line 11—11 of the linked sample trays of FIG. 7 showing the coupling mechanism of the two trays.

FIG. 13 is a flow diagram for the real time operating system controlling the general operation of the gamma counter.

FIG. 14 represents a flow diagram of the program which places the operating components of the gamma counter into the "ready" configuration upon the initial application of power to the instrument.

DETAILED DESCRIPTION

Figure 5:
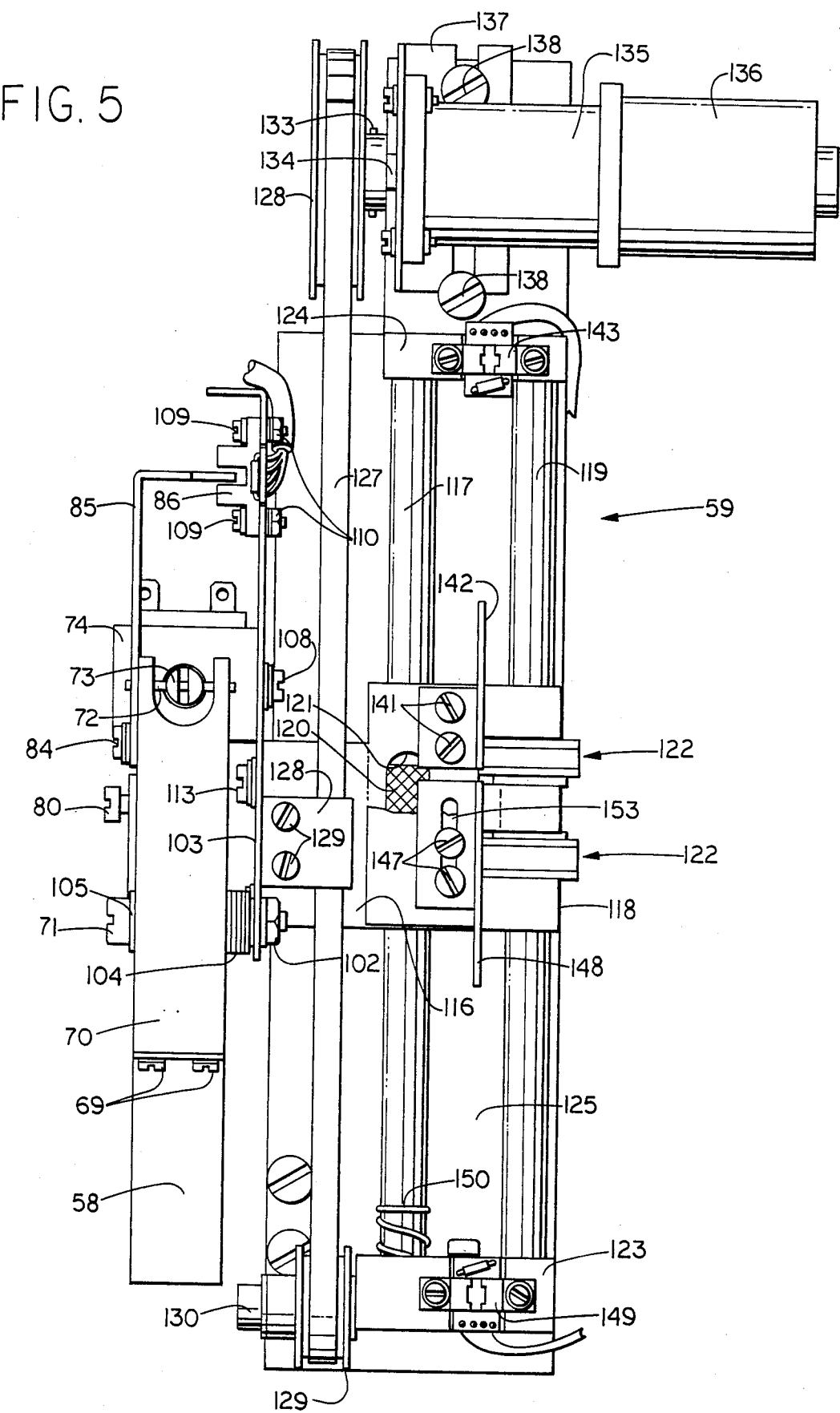
FIG. 5 portrays the elevator mechanism which raises and lowers the gripping fingers and, thus, the sample tube into and out of the carrier trays, the counting well, and, for the standard source, its holder.

FIG. 1 shows generally at 20 a gamma counter which automatically performs assays. The samples undergoing the assays sit in a sample tray 21 moving along in either the front channel 22 or the rear channel 23.

As shown in FIG. 1, the tray 21 can move in either channel 22 or 23 from right to left. When the tray moves inside of the housing 24, the mechanism inside moves the sample tubes from the tray 21, one at a time, to a counting well to obtain a radiological analysis of the sample. The mechanism then returns the tube 25 to the sample tray 21 which then continues its travel along the path 22 or 23 to the left.

After the instrument has analyzed each of the sample tubes 25 within a tray 21, the operator may remove the tray 21 from the channel 22 or 23, as appropriate. However, should the operator not remove the sample tray 21, the instrument will continue to move additional trays through the housing 24 and push the tray 21 to the left. This can continue until the sample tray 21 abuts against the barrier 28. The barrier 28, in turn, simply prevents the sample trays from falling out of the channels 22 and 23 and off the instrument 20.

The instrument 20 also includes a printer 29 which provides a permanent report on the results of performed analyses. It also prints such information as the operator's name, the time of day, and the results of the appropriate calibrations.

Furthermore, the exterior of the instrument 20 includes the control panel 30 which incorporates the pressure sensitive keys 31 and the LED display panel 32. The keys 31 generally have dual functions. This allows them to operate in the alphanumeric mode and to permit the facile selection of particular instrumental functions. One of the keys 31 permits the selection between the two functions for the other keys.

As shown in FIGS. 2 and 3, the instrument also includes a connection 35 to a power source and an on-off switch 36. Not seen in the exterior views of FIGS. 1 and 2, the instrument also has a connection to link the memory of the instrument's microprocessor with an external source. Conveniently, this may take the form of a typical RS 232 coupling A bar code reader 37 may have a location in front of the tray 21. There, it may obtain, through the mirror 38, information contained on the tray's front. The reader 37, when the tray moves in the channel 22, may retract upward to avoid interfering with the tray's progress. The reader 37 occupies the position shown in phantom when reading the code on a tray in the rear channel 23.

To perform an assay, the operator places the sample tray 21 with the tubes 25 on one of the paths 22 or 23. He then indicates on the switches 31 of the control panel 30 the assay he wishes to have performed as well as various pieces of information. In particular, he will inform the instrument as to whether the tray 21 sits in the front or rear channel 22 or 23.

In either event, the operator pushes the tray 21 until it abuts against the wide pinion gear 39 of the front channel 22 or the similar gear 40 of the rear channel 23. The tray 21 includes a rack gear on its lower surface which the discussion below concerning FIGS. 9 and 10 and 11 indicates. With the tray 21 in contact with either of the gears 39 or 40, the remaining operation of the instrument 20 becomes automatic.

The gear 39 or 40 rotates to move the tray 21 into operational position. The motors 41 and 42, lying below the channels 22 and 23 and seen in FIG. 6, provide power to the gears 39 and 40 respectively.

To insure the firm engagement between the gear 39 or 40 and the tray 21, the front channel 22 includes the hanging ledge 43 attached to the post 44. Similarly, the rear channel 23 includes the ledge 45 attached to the post 46. The ledges 43 and 45 extend sufficiently into the channels 22 and 23 to actually lie over the ridge 49 on the tray 21. In fact, as shown in FIGS. 7 to 9, the tabs 50 extend from the ridge 49 and will also lie beneath the overhanging ledge 43 or 45.

The ledge 43 or 45, when lying over the ridge 49, prevents the tray 21 from tipping upwards under the action of the moving gear 39 or 40, as appropriate. Thus, the ledges 43 and 45, by pushing downwards on the ridge 49 and the tabs 50, force the tray 21 into contact with the rotating pinion gear 39 or 40. As a result, when either or both of these gears rotates, it moves the tray into position for the assays on the samples.

To stop the gears 39 and 40, and thus the tray 21, the front channel 23 includes the sensor 53. The pinion gears 39 and 40 move a tray in the front channel 22 or the rear channel 23, respectively, until the tabs 50 (shown in FIGS. 7 to 9) interrupt the opto-sensor 53 or 54, respectively. In fact, the tabs 50 have the purpose of providing an indication through the opto-sensors 53 and 54 as to when the pinion gears 39 and 40, respectively, should stop.

Each row of tubes 25 in the tray 21 has a separate tab 50. The location of the tab will cause its relative row, when the tab interrupts the photodetector 53 or 54, to occupy the operational position where its sample tubes may travel to the counting well.

In particular, when a tab 50 interrupts the opto-sensor 53 or 54, a row of tubes will lie directly underneath the fingers 57 and 58. The fingers 57 and 58, in turn, couple to the transport and elevator mechanism, shown generally at 59. The fingers 57 and 58, in conjunction with the elevator-transport mechanism 59, lift a tube 25 from the tray 21, transport it to a location directly above the counting well 60 shown in FIG. 6. They then lower the tube into the well 60 for counting. After the completion of the counting, the tube 21 is lifted out of the well 60, returned to a location above its original position within the tray 21, and then lowered into the tray.

As FIG. 4 shows, the finger 57 has the right-angle bend 61 and a short section 62 which the screws 63 attach to the post 64. The post 64 can rotate about the bolt 65 and thus operates as a short lever arm. Similarly, the screws 69 affix the short horizontal section 68 of the finger 58 to the longer post, or lever arm, 70. The long post 70 can similarly rotate about the bolt 71 and, thus, acts as a long lever arm.

As better shown in FIG. 5, the pin 72 couples the upper end of the post 70 to the piston 73 of the solenoid 74 shown in FIG. 4. The solenoid receives its power through the cord 75.

In its energized configuration, the solenoid 74 retracts the piston 73, thus pulling the top of the post 70 towards it. In turn, the post 70 rotates about the pin 71 causing the bottom of the post 70, and accordingly, the finger 58 to move to the right in FIG. 4.

Furthermore, the pins 80 and 81 rotatably couple the bar 79 to the posts 70 and 64, respectively. When the solenoid 74 energizes and pulls the top of the post 70 towards itself, it also moves the pin 80 and thus the bar 79 to the left as seen in FIG. 4. This causes the bottom of the post 64 to rotate about the pin 65 to the left, thus also moving the finger 57 to the left.

As a result, when the solenoid 74 energizes and retracts its piston 73, the finger 58 in FIG. 4 moves to the right and the finger 57 moves to the left. The energizing of the solenoid 74 thus results in the fingers 57 and 58 assuming an open configuration in which they cannot grip a sample tube between them.

In addition, the screw 84 attaches the metal arm 85 to the post 70. The top of the arm 85 bends over into the drawing in FIG. 4. However, only the portion on the left of the lever arm 85 extends far enough into FIG. 4 to actually reach the optical sensor 86. As a consequence, with the fingers 57 and 58 open, the light path of the optical sensor 86 remains uninterrupted to indicate the open configuration of the fingers 57 and 58.

The spring 88 attaches, through the pin 81, to the bottom of the post 64 and through the pin 88 to the bottom of the post 70. When the solenoid 74 deenergizes, the piston 73 becomes free to move out of the solenoid 74. Without the solenoid 74 pulling in the piston 73, the force of the spring 87 suffices to pull the bottoms of the posts 64 and 70 towards each other. When this happens, the fingers 57 and 58 move towards each other and assume a closed configuration. Because of the similar configurations of the post 64 below the pin 65 and of the post 70 below the pin 71, the fingers 57 and 58 execute approximately similar motions between the open and closed configurations.

The fingers 57 and 58, however, have several closed configurations. When they close upon a sample tube, the fingers 57 and 58 undergo comparatively slight motion. They stop, of course, when their pads 89 and 90 contact a sample tube. In this position, the spring 87 exerts sufficient closing force upon the fingers' pads 89 and 90 to retain the sample tube within their grip. The extent of travel, in particular, of the finger 58, when transmitted to the extension arm 85, does not suffice to bring it into the light path of the optical sensor 86. Thus, when the solenoid 74 deenergizes and the fingers 57 and 58 close upon a sample tube, the sensor 86 informs the instrument's computer that its light path remained uninterrupted. As a result, the microcomputer learns that when the fingers 57 and 58 moved away from their open configuration, they have, in fact, gripped a sample tube.

If the fingers 57 and 58 close without a sample tube between them, they experience greater motion. In fact, the bottom of the posts 64 and 70 move towards each other until the former contacts the screw 93 attached to the latter. The screw 93 limits the motion of the fingers 57 and 58 towards each other when closing without a sample holder between them. However, it allows sufficient motion for the top of the extension arm 85 to interrupt the optical sensor 86. Thus, the light path of the sensor 86 becomes blocked only when the fingers 57 and 58 move closer together than permitted were a sample tube between them. This interruption of the light path of the optical sensor 86 informs the computer that the fingers 57 and 58 have closed but that they do not hold a sample tube.

The force of the solenoid 74 acting on its piston 73 overcomes the counter force of the spring 87. However, the force of the spring 87, with the solenoid 74 deenergized, suffices to hold onto a sample tube carrying a sample inside. In fact, the spring 87 exerts a substantially constant closing force on the fingers 57 and 58 regardless of the different sizes of sample tubes that they may hold between them.

FIGS. 4a and 4b illustrate the structure of the pad 89 attached to the finger 57. This, of course, closely resembles the pad 90 attached to the finger 58. The pad 89 has a construction of rubber to increase its contact friction with the sample tube it may hold. This assists the fingers 57 and 58 in retaining their grip on a tube held between them. Furthermore, the rubber composition of the pads 89 and 90 avoids marring or damaging a sample tube when the fingers 57 and 58 close upon it.

The center 97 of the pad 89 has a generally concave configuration to approximate the exterior shape of the sample tube. This again helps the fingers 57 and 58 to retain their grip on the sample tube. The edges 98 and 99 of the pad 89 have a bevelled configuration. As the fingers 89 and 90 move transversely along a row of sample tubes, some of the tubes may not stand completely erect. They may lean towards either the finger 57 or the finger 58. As the fingers approach the waiting sample tube, the bevelled edge 98 or 99, depending upon the finger's direction, gently contacts the sample tube. As the fingers continue their motion, the pad's edge 98 or 99 then softly forces the tube into a vertical orientation. Thus, the bevelled edges 98 and 99 prevent the moving fingers 57 and 58 from directly knocking against a sample tube and perhaps damaging it. Rather, they gently align the tube to a vertical orientation so that the fingers 57 and 58 may continue their travel without inflicting any damage upon it.

After the fingers 57 and 58 grip a tube in the carrier tray 21, they must raise it from the tray in order to move it to the detector. As part of the mechanism that accomplishes this feat, the nut 102 in FIG. 5 couples the bolt 71 to the metal plate 103. The washers 104 maintain the desired spacing between the post 70 and the plate 103 and, with the washer 105, permit the post 70 to rotate about the bolt 71. A similar construction attaches the bolt 65 to the plate 103 with only the washer 106 appearing in FIG. 4. Similarly, the bolt 108 attaches the solenoid 74 to the plate 103. Lastly, the bolts 109 and the nuts 110 attach the sensor 86 to the plate 103. Thus, the plate 103 maintains the relative spatial configuration of all of these attached components.

In turn, the screws 112 and 113 (with the latter seen in FIG. 4) attach the plate 103 to the plastic or preferably metal block 116. Thus, the metal plate 103, the fingers 57 and 58, and the other components connected to the fingers all move as a unit with the metal block 116.

The block 116 has a circular opening passing all the way through it and into which fits the vertical steel bar 117. This permits the plastic block 116 to travel vertically along the vertical steel rod 117.

Further, the rear 118 of the metal block 116 has an opening from its top to its bottom into which fits the steel rod 119. This opening in the rear 118 of the block 116 takes the form of a "U", rather than being an entirely enclosed circle. Thus, the block 116 may move slightly. towards and away from the steel rod 119. Were the rear 118 of the block 116 entirely enclosed around the rod 119, any slight distortion of the exact distance between the rods 117 and 119 could bind the block 116 against them. This would result in the concomitant loss of the freedom of vertical motion of the block 116.

In the present configuration, the rod 117 fits through an opening passing through the block 116. The metal block 116 can thus travel vertically along the steel rod 117. The other steel rod 119 fits into the back 118 of the block 116 and prevents rotation of the block 116 around the steel rod 117. Thus, the block 116 becomes limited to vertical motion along the steel rods 117 and 118; yet it does not encounter a binding restriction because of a minor change in the distance between the steel rods 117 and 119 possibly due to a temperature change.

The felt pad 120, seen through the opening 121 in the block 116, applies a lubricating oil to the bar 117. Similarly, pads contained within the cuff washers 122 apply a lubricant to the rod 119. The oil applied to the bars 117 and 119 helps to prevent any hindrance to the free vertical motion of the metal block 116.

The block 123 securely anchors the bottoms of the steel rods 117 and 119; a similar block 124 securely anchors their tops. The blocks 123 and 124, in turn, securely attach to the steel plate 125 which retains all of the components in a fixed spatial configuration relative to each other.

To provide its vertical motion, the block 116 has the belt 127 secured to it by the plate 128. The screws 129 securely affix the plate, and thus the belt 127, to the metal block 116. The belt 127 has a ribbed interior surface to provide it with traction. The belt extends around the drive sprocket wheel 128 and the idler sprocket wheel 129. The bolt 130 attaches the idler sprocket 129 to the lower anchoring block 123.

The drive sprocket wheel 128 attaches, through the pin 133, to the axle 134 of gear box 135 operated by the motor 136. The motor 136, in turn, attaches to the right-angle bracket 137 which the screws 138 affix to the plate 125.

When the motor 136 rotates the drive sprocket 128 so that the wheel's forward portion, as seen in FIG. 5, moves upward, the half of the belt 127, visible in FIG. 5, also moves upward. This causes the metal block 116 to travel upward along the rods 117 and 119. In turn, the steel plate 103 moves upward and takes the fingers 57 and 58 with it. When the motor 136 operates in the opposite direction, the portion of the belt 127 appearing in FIG. 5, the block 116, and the fingers 57 and 58 all move downward.

The two screws 141 attach the tab 142 to the metal block 116. As the fingers 57 and 58, and thus the block 116, move upward, the tab 142 moves in the same direction. However, the upward motion of the tab 142 eventually causes it to interfere with the light path of the optical sensor 143.

The interfering with the optical sensor 143 by the tab 142 informs the controlling microcomputer that the fingers 57 and 58 have reached their upper limit of their travel. The microcomputer responds by stopping the motor 136 from rotating further in the direction that would raise the fingers 57 and 58.

Similarly, the screws 147 retain the tab 148 to the metal block 116. Downward motion of the fingers 57 and 58 and thus the block 116 causes the tab 148 to similarly descend. The tab 148 can continue its downward motion until it interferes with the light path of the lower optical sensor 149. This occurrence informs the microcomputer that the fingers 57 and 58 have reached their lower limit of travel and to turn off the motor 136. The spring 150 acts as a guard to cushion the downward travel of the block 116 should that become necessary.

The screws 147 fit into the elongated opening 153. This permits the vertical adjustment of the tab 148. The lower limit of the travel of the fingers 57 and 58 determines where they will grab a sample tube in the sample tray 21. It also determines how far down they will lower a sample tube into the counting well 60 (in FIG. 6). The adjustment permitted by the elongated opening 153 allows the correction of the lower limit of the travel of the fingers 57 and 58. As a consequence, they will properly grip a sample tube and lower it to the proper depth in the counting well 60.

In its normal operation, the fingers 57 and 58 will move to a location about a sample tube only with the metal block 116 in its lower configuration, shown in solid lines in FIG. 6. The fingers 57 and 58 then close to grip onto a sample tube 25. The motor 136 raises the metal block 116 until it reaches its upper configuration shown in phantom in FIG. 6. At this height, the block 116 will have elevated the fingers 57 and 58 sufficiently to remove the sample tube 25 from the carrier tray 21. At this point, the sample tube must then travel to a location over the counting well 60.

To permit the travel of the fingers 57 and 58 from left to right in FIG. 6, the screws 158 attach the block 157 securely to the steel plate 125, as seen in FIG. 4. The block 157, in turn, surrounds the horizontal steel rod 160.

The block 157 attaches to the steel plate 125 and thus to all of the components connected with the fingers 57 and 58 and the elevating mechanism associated with the block 116. The block 157, as a result, supports the weight of all of these components on the steel rod 116.

As seen in FIG. 4, the center of gravity of the weight of all these components of the elevator-transport mechanism 59 lies to the right of the center of the steel rod 160. However, the screws 162 attach the metal block 163 with the freely rotating wheel 164 to the bottom of the steel plate 125. The wheel 164, in turn, abuts against the steel plate 165 to prevent clockwise rotation of the elevating-transport mechanism 59.

Thus, the block 157 can move horizontally along the rod 160 and rotate in a verticle plane about it. The permitted clockwise motion of the elevator-transport mechanism 59, however, cannot occur because of the abutment of the wheel 164 against the plate 165.

Nonetheless, to compensate for expansion or contraction of the different components, the wheel 164 can move vertically a slight amount along the plate 165. Thus, the expansion and contraction with the temperature of the components will not produce any binding effect upon the components as they move along the steel bar 160.

As seen in FIG. 6, both the steel bar 160 and the steel plate 165 securely attach to the vertical member 169 at the left and the vertical member 170 at the right. Both of the members 169 and 170 then connect to the steel plate 171 at the bottom of the instrument 20.

Thus, the elevator-transport mechanism 59, which includes the fingers 57 and 58, receives its support from the steel bar 160. The vertical members 169 and 170, in turn, support the steel bar 160.

As shown in FIG. 6, the metal block 157 must remain on the steel bar 160 and thus between the supporting members 169 and 170. As a result, the full weight of the elevator-transport mechanism 59 rests on the steel bar 160, supported at its ends by the members 169 and 170. At no time does the steel bar 160 assume a cantilevered configuration supporting the weight of the elevator-transport mechanism 59 beyond either member 169 or 170; the steel bar 160 and the weight it supports remains suspended between the two members. In the absence of a cantilevered construction, the weight of the elevator-transport mechanism 59 cannot effect a substantial distortion in the shape of the steel bar 169.

FIG. 6 shows the elevator-transport mechanism 59, in solid lines, at about the furthest position to the left that it normally occupies. In this position, it permits the fingers 57 and 58 to pick up the sample tube 173 lying in the furthest left column of the tray 21 in the front channel 22. To pick up any of the other sample tubes 25 in either the sample tray 21 in the front channel 22 or in the sample tray 21" of the rear channel 23, the elevator-transport mechanism moves to the right along the steel bar 160.

The elevator-transport mechanism 59 also appears in phantom outline at the right in FIG. 6. The phantom view shows the mechanism 59 at its furthest right position (i.e., to the instrument's rear) that it can normally occupy. There, it holds the sample tube 173 in a position either over or in the counting well 60. This permits the determination of the radioactivity of the sample within the tube 173. As indicated in FIG. 6, the fingers 57 and 58 continue to hold onto the sample tube 173 all the while it remains within the well 60.

Upon the completion of the counting process, the fingers 57 and 58 raise the sample holder 173 out of the counting well 60. The elevator-transport mechanism 59 then returns the sample tube 173 to the left until it arrives at a position over the location it previously occupied in the tray 21 or 21″. The elevator-transport mechanism 59 then lowers the fingers 57 and 58 until the tube 173 returns to its position within the appropriate tray.

To move the elevator-transport mechanism left and right in FIG. 6, the instrument 20 includes the motor 175 attached to the steel plate 165 by the screws 176. The motor powers the sprocket wheel 177 which has the belt 178 wrapped around it. The idler sprocket 179 maintains the belt 178 in a taut condition. As with the belt 127 for the elevator mechanism, the belt 178 has ribs on its interior surface to prevent slippage between it and the power sprocket wheel 177. As seen in FIG. 4, the screws 181 squeeze the belt 178 between the steel plates 182 and firmly attach the plates 182 with the coupled belt 178 to the block 157.

Thus, the motor 175 rotates the sprocket wheel 177. That causes the belt 178 to move between the powered sprocket wheel 177 and the idler sprocket 179. As the upper portion of the belt 178, in particular, moves backward and forward, it moves the block 157 along the steel bar 160. This, in turn, causes the elevator-transport mechanism 59 to move between the front and the rear of the instrument. As a result, a sample tube, held by the fingers 57 and 58, travels between the trays 21 and 21″ and the counting well 60.

Near its rear, the steel plate 165 includes the optical sensor 185. The screws 186 securely attach the sensor 185 to the plate 165. When the elevator-transport mechanism 59 has moved to its furthest rear position in the instrument 20 (shown in phantom at the right in FIG. 6), the tab 188 interrupts the light path of the optical sensor 185. The tab 188 connects to the block 163 which moves with the elevator-transport mechanism 59. Thus, the interruption of the light path of the optical sensor 185 by the tab 188 indicates that the elevator-transport mechanism 59 occupies a predetermined "home" position.

The instrument as shown does not include additional optical sensors at any location other than the home position of the elevator-transport mechanism 59. Accordingly, to properly locate the elevator-transport mechanism at some position other than "home" at which the tab 188 interrupts the optical sensor 185, the motor 175 takes the form of a stepper motor. Thus, determining the position of the elevator-transport mechanism 59 along the bar 160 merely requires counting the number of rotation steps of the motor 175 when moving the mechanism. Specifically, the computer algebraically adds the number of steps that the motor 175 moves the mechanism 59 away from and towards the home position. Thus, the mechanism 159 need not return between each horizontal displacement to the position where the tab 188 interrupts the sensor 185. Rather, it can move back and forth any number of times before it reaches its predetermined home position. The computer then merely keeps track of the steps of motion away from and towards the sensor 185 to keep track of the position of the mechanism 59.

The elevator-transport mechanism 59 has a substantial mass which thus presents substantial inertia to its movement by the stepper motor 175. Were the stepper motor 175 to attempt a too rapid movement of the mechanism 59, a number of steps might become "lost". In other words, the motor would attempt to execute these steps but not actually accomplish the objective. However, the computer would count these steps as motion of the mechanism 59 actually achieved. As a consequence, the motor 175 should not attempt a too rapid acceleration or deceleration when moving the mechanism 59 horizontally between the front and the back of the instrument. Accordingly, when starting or stopping the translation of the mechanism 59, the stepper motor 175 must move slowly.

However, during the course of the motion, aside from starting or stopping, the stepper motor can proceed rapidly. In fact, it should do so in order to achieve the movement of the mechanism 59 within reasonable periods of time. Accordingly, the program controlling the operation of the motor 175 controllably accelerates the operation of the stepper motor at the beginning of an operation. It also controllably decelerates the stepper motor 175 to again avoid the miscounting of steps of movement of the mechanism 59.

FIG. 6 shows a sample tube 191. The tube 191 contains a standard sample with a known radioactive nucleus. In particular, it holds $I^{129}$ radioactive material. This sample has the known radioactive behavior of providing gamma particles with an energy of 29 KeV. As discussed with regards to FIG. 18 below, the known sample within the tube 191 permits the automatic self-calibration of the instrument 20.

The sample tube 191 sits within the holder 192. The holder 192 places the tube 191 directly below the path of the fingers 57 and 58 as the elevator-transport mechanism 59 moves between the instrument's front and rear (or, left and right in FIG. 6). At the appropriate time for calibration, the elevator-transport mechanism 59 moves over to the sample holder 192. The fingers 57 and 58 grip the sample tube 191 and move it into the counting well 60. The instrument may then calibrate itself as discussed below.

The counting well 60 makes the determinations for both the calibrations and the assays of unknowns. It includes the lead shield 193 and a luminescent coating within the well 60. The gamma particles from a sample tube 173 strike the luminescent coating to create flashes of light. A window in the lead container 193 permits these light flashes to travel to the photomultiplier tube 194 which converts them into electrical pulses. The pulses have a magnitude directly proportional to the energy of the emitted gamma particles. The instrument then processes these electrical pulses to give the appropriate count of the radioactive particles having an energy within the desired window.

As shown in FIG. 7, the tray 21 includes four rows 202 each holding five sample tubes 25. Each tab 50 corresponds to one of the rows 202. As discussed above, each tab 50, when it intercepts the optical sensor 53 or 54 in FIG. 3, causes the motor of the pinion gears 39 or 40, respectively, to stop, and place one of the rows 202 of sample tubes underneath the fingers 57 and 58.

Specifically, each leading edge 203 of the tabs 50 sits at a predetermined distance away from the center of the row 202 to which that tab corresponds. As shown in FIG. 7, in particular, the leading edge 63 sits at a slight distance towards the front 204 of the tray 21. This offset of the leading edges 203 of the tabs 50 from the center of the rows 202 compensates for the position of the optical sensors 53 and 54 relative to the fingers 57 and 58. It also corrects for time actually required for the pinion gears 39 and 40 to come to a stop after the tabs 50 have interrupted the appropriate optical sensor.

The stopping of the tray underneath the elevator-transport mechanism 59 depends solely upon the tabs 50 attached to the tray 21. Consequently, the tray 21 may include a different number of rows than the four rows shown in FIG. 7. Thus, for example, increasing the number of rows 202 would merely involve a larger tray having additional tabs 50 on its edge. In particular, the tray may include twelve rows with the same number of tabs 50 and, correspondingly, hold 60 tubes.

Changing the number of columns 204 represents a more difficult task. The program in the instrument's microcomputer must include a subroutine that would allow it to respond to an indication that the tray has a different number than five columns. This received indication would then control the positioning of fingers 57 and 58 over the sample tubes 25.

The letters 205 on the tab 50 and on the ridge 49 on the other side of the tray inform the operator of the particular rows in which the tubes 25 sit. Similarly, the numbers 206 indicate the particular columns for the tubes.

To actually hold the tubes 25, the rack 209 sits inside of the tray 21. The opening 210 in the rack 209 serves to place the tubes 25 in their correct positions. The rack 209 may have a construction of plastic, Styrofoam, cardboard, or many other materials. In particular, when made of a less expensive material, the rack 209 can constitute part of the original containers for the sample tubes 25. Disposal of a less expensive rack 209 after use prevents contamination of one rack by the radioactive contents of the sample tubes from prior assays.

The bottom 211 of the tray 21 provides a surface upon which the rack 209 sits. Since the rack 209 has its own lower surface 212, the tray's bottom 211 need not extend across the entire width of the tray. Accordingly, the opening 213 in the tray's bottom 211 saves material and expense in the tray's construction, as also seen in FIG. 8.

The front 204, the rear 215, and the two sides 216 of the tray include the ribs 217 extending into the tray's interior. The ribs 217 assure the proper positioning of the rack 209 within. The sloping tops 218 assist in the initial insertion of the rack 209 into the tray 21.

FIG. 8a shows the front end 204 of the tray 21 and the front 219 of the rack 209. The code 220 appears on the front of the rack 209 where the reader 37 of FIG. 3 can obtain its information. The data contained in the code 220 may relate to the number of columns in the rack 209, the assays that should be performed on the tubes in the rack 209, and other such information.

As discussed above with regards to FIGS. 1 through 3, the pinion gears 39 and 40 of the instrument engage rack gears on the bottom of the tray 21. These gears appear in FIGS. 9 through 11. Specifically, each tray 21 includes a long thin rack gear 223 running almost the entire length of one side of the tray and a similar long thin rack gear 224 on the other side. Lastly, the tray's bottom 211 includes a very short but wide rack gear 225 at its front surface 204. As shown in FIG. 10, the front rack gear 225 merges immediately into the side gears 223 and 224 to form, in effect, a single gear running the entire length of the tray 21. Once one of the pinion gears 39 or 40 has engaged the front rack gear 225, it will then proceed to engage properly the teeth of the side gears 223 and 224.

The wide short gear 225 has the purpose of assuring the proper alignment of the tray 21 over the pinion gear 39 or 40, as appropriate. In other words, a wide tooth of the pinion gear 39 or 40 first engages the first wide tooth 226 of the rack gear 225. Even if tray 21 has a slight misalignment relative to the pinion gear 39 or 40, the engagement between the pinion gear 39 or 40 and the first tooth 226 of the rack gear 225 will force the tray 21 into proper alignment. The pinion gear 39 or 40 will then proceed to engage the thinner rack gears 223 and 224 lying behind the front gear 225.

Conceivably, the pinion gear 39 or 40 could mesh with the rack gears 223 and 225 with a slight misalignment between them; in other words, the tray 21 would not, were this to occur, proceed perpendicularly across the pinion gear 39 or 40. However, the prior engagement of the pinion gear 39 or 40 with the wide front gear 225 has previously forced the tray 21 into proper alignment; it thus prevents any misalignment between the long, thin gears 223 and 224 with the pinion gear 39 or 40.

The front tooth 226 of the front gear 225 appears thinner than any other tooth in either the front gear 225 or the rear gears 223 and 224. This facilitates the initial engagement of the pinion gear 39 or 40 with the teeth of the tray 21.

The thin rack gears 223 and 225 also include the trailing segments 227 and 228 which extend beyond their tray's rear surface 215. As shown in FIG. 11, these extended portions create a continuous rack gear between the two coupled trays 21 and 21'. Additionally, the overhanging gear segments 227 and 228 provide the proper spacing between the bottoms of the two coupled trays 21 and 21'. The triangular stiffening sections 229 and 230 (with the latter shown in FIG. 7) provide structural rigidity to the overhanging gear segments 227 and 228, respectively.

For the actual coupling between trays, the tray 21 includes the T-tab 232 attached to the top of the tray's front 204, as shown in FIG. 9. The C-hook 233 attaches to the tray's rear 215. The T-tab 232, when inserted into the C-hook 233, as in FIGS. 7 and 11, connects the two trays 21 and 21' together and permits them to move as a unit. In fact, the front and rear channels 22 and 23 of the instrument in FIGS. 1 through 3 can each accomodate several trays. When several coupled trays occupy one of the channels 22 and 23, the pinion gear 39 or 40 will move all of the linked trays together as a single unit in the form of a train. The motors 41 and 42 coupled to the gears 39 and 40, respectively, each have sufficient power to move a train of coupled trays in the channels 22 and 23.

A train of coupled trays, nonetheless, receives its power only from either pinion gear 39 or 40. Thus, regardless of the length of the tray train, it receives its power from the single point in the channel 22 or 23 where it contacts the pinion gear 39 or 40, as appropriate. Regardless of the length of the train, the instrument provides the power to it at a single point along the path of its movement. As a consequence, the operator may add additional trays at the end of the train without the threat of adversely interfering with the motive mechanism. Further, he can add the trays while the instrument performs assays on tubes from trays previously added. Moreover, the memory in the instrument's microcomputer allows the operator to indicate on the control panel 30 the assays desired for the newly added trays. And, after the instrument has completed the assays for all the tubes in a particular tray, the operator may remove that tray while the instrument continues its assays of tubes in other trays Furthermore, adding an additional tray to a coupled train in the channel 22 or 23 represents a simple task. As illustrated in FIG. 11, with the trays 21 and 21' coupled together, the C-hook 233 abuts directly against the front surface 224 of the following tray 21'. Thus, to add a further tray to the train, the operator holds the following tray 21' at a sufficient height above the leading tray 21 that the T-tab 232 cannot contact the C-hook 233. Since neither of the components of the coupling mechanism extends below half the tray's height, this merely requires holding the following tray 21' at about one third of the tray's height above the leading tray 21. The operator then moves the following tray 21' up against the leading tray 21 until its C-hook 233 contacts the front surface 224 of the former. Lowering the following tray 21' until it sits on the surface of the channel 22 or 23 causes the T-tab 232 to enter the opening 235 of the C-hook 233 and couple the two trays.

As shown in FIGS. 7 and 11, the C-hook 233 establishes the proper distance between the top of the two sample trays 21 and 21'. This distance corresponds to the separation established between the bottoms of these trays by the overhanging gear portions 227 and 228.

However, to assure the proper distance between the trays 21 and 21', the C-hook 233 must abut directly against the front 204 of the following tray 21'. To accomplish this objective, the T-tab 233 actually pushes the C-hook 232 against the tray's front surface 204.

In fact, as seen in FIG. 9, the width of the rear portions 238 of the C-hook 233 actually exceeds the distance between the tips 237 of the T-tab 232 and the front surface 204 of the tray 21. As a result, when the T-tab 232 enters the C-hook 235, the width of the extension 238 actually forces the tips 237 outward and away from the front 204 of the tray 21.

The resilience of the T-tab 234, in turn, causes the tips 237 to push the extensions 238 and thus the C-hook 233 back towards the front 204 of the leading tray 21. This resilient flexing of the T-tab 237 against the C-hook 233, in fact, forces the latter directly into contact with the front 204 of the tray 21.

To assist in its resilient flexing and insertion into the C-hook 235, the T-tab 232 includes the thin sections 239 adjacent to its tips 237. These thinner sections 239 more readily bend without breaking. Their resiliency forces the two trays 21 and 21' into contact with each other.

As stated above, the tips 237 of the T-tab 232 have a greater thickness than the flexing portions 239. To aid their insertion into the C-hook 235, they have the lower bevelled edges 240. Thus, insufficient room exists between the end portions 237 of the T-tab 232 to accomodate the width of the extensions 238 of the C-hook 233. Yet, the bevelled edge 240 of the T-tab 232 fits over the extensions 238 to permit the initial placement of the T-tab 232 into the opening of the C-hook 233. The continued insertion forces the thicker end portion 237 into the opening 235 and flexes the middle sections 239 of the T-tab 232.

Figure 12:
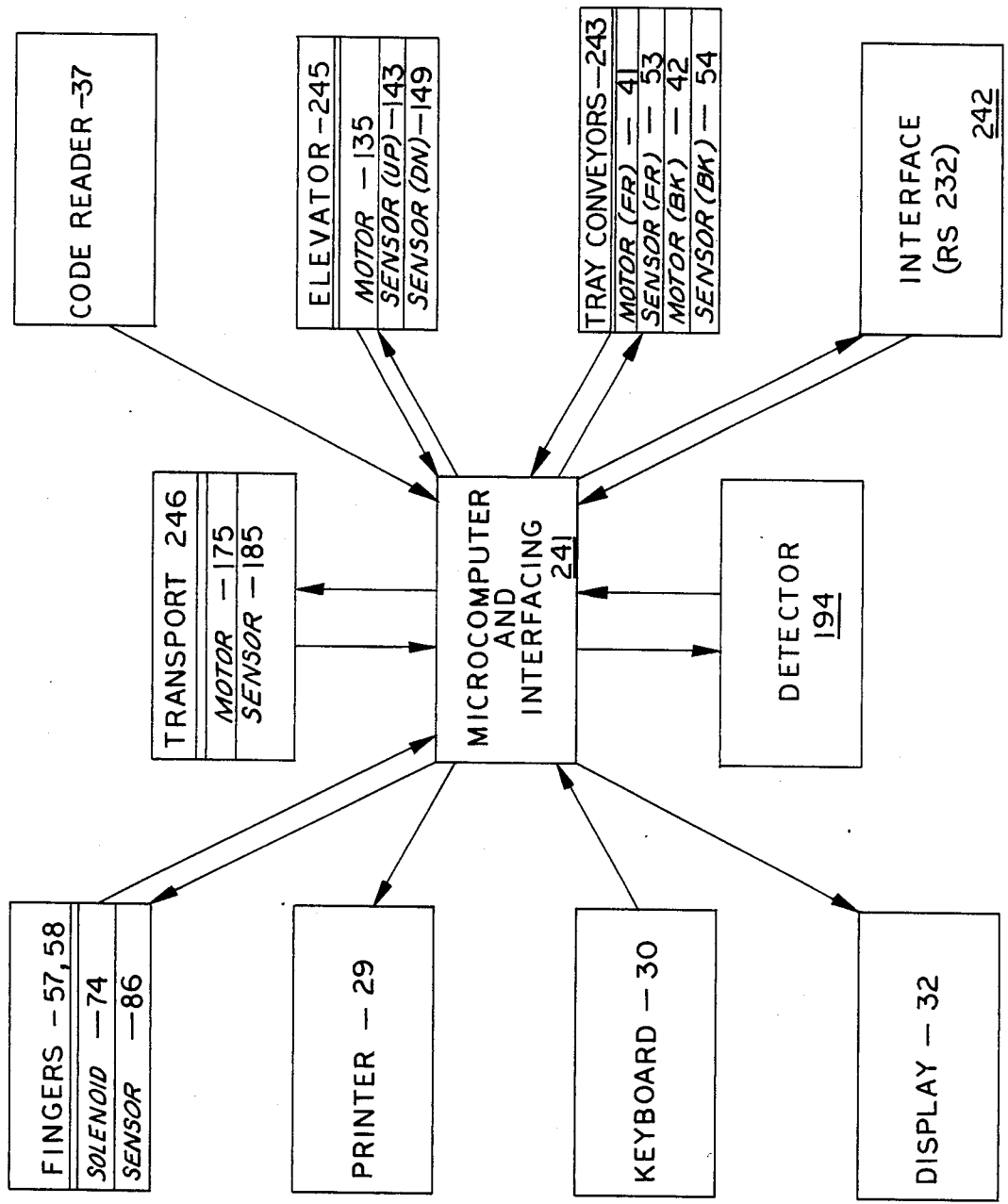
FIG. 12 gives a block diagram of the electrical and electronic components of the gamma counter of FIGS. 1 through 6.

FIG. 12, in block diagram, shows the electronic components of the gamma counter 20. At the heart of the electronics lies the microcomputer 241 with its interfacing. This receives the commands and information that the operator places on the keyboard 30. Moreover, it provides output information for the operator on the printer 29 and the display panel 32. The interface connection 242 permits the transmission of the same information to and from the microcomputer 201.

The detector 194 also has a dual path along which information travels to and from the microcomputer 241. Naturally, the results of a measurement performed by the detector 194 travel to the microcomputer 241 for processing and display. However, the microcomputer and its interfacing 241 provide information to the detector 194 to control its high voltage.

Similarly, a dual pathway exists between the microcomputer 241 and the tray conveyors 243. The path from the former to the latter operates the motor 41 that powers the pinion gear 39 in the front channel 22. Similarly, the pathway provides the control over the motor 42 for the rear channel's pinion gear 40. The converse path informs the microcomputer 241 as to when the tabs 50 have interrupted the sensors 53 and 54 in order to stop the appropriate pinion gear.

In a similar fashion, the microcomputer 241 sends information to and receives data from the elevator mechanism 245. Thus, the information travelling to the elevator 245 controls its motor 135, while the computer receives information from the up and down sensors 143 and 149, respectively.

The microcomputer 241 also receives and sends information to the fingers 57 and 58. The information sent to the fingers control the solenoid 74. The information travelling in the opposite direction to the microcomputer derives from the fingers' sensor 86 and indicates whether or not the fingers actually hold a tube.

A similar dual information path exists between the microcomputer 241 and the transport mechanism 246. Information in one direction controls the operation of the transport's motor 175. In the opposite direction, the sensor 185 informs the microcomputer when the position of the elevator-transport mechanism 59 occupies its home position. This assists the microcomputer 241 in turning off the transport's motor 175 when the elevator-transport mechanism 59 reaches the appropriate position.

FIG. 13 diagrams the master program in the microcomputer for controlling the overall operation of the instrument. As shown in the circle 251, the program includes a clock operating in units of ten milliseconds. After the passage of each ten millisecond period of time, the program updates the clock as shown in box 252.

Furthermore, the program follows the complete procedure shown in FIG. 13 in each ten millisecond period of time. Specifically, at the beginning of each period, the diamond 253 asks whether the time has arrived to place either a scheduled message or a scheduled task into the queue. The memory of the microcomputer includes a listing of several messages that should appear on the display panel 32. This may occur at particular times of the day or the year or after the instrument has undergone certain amounts and types of use. These messages may include, for example, "CALL YOUR SERVICE REPRESENTATIVE", and the like.

Similarly, the instrument should perform various tasks at particular times of the day. This includes a daily calibration which the machine performs automatically. The instrument generally performs the calibration at a time of low overall activity, such as 5:00 in the morning.

At the beginning of a ten millisecond period, the program looks to see if the time has arrived for the instrument to display a message or perform a task. If so, it will place the task or the message into the queue as shown in the box 254. If not, the program skips box 254 and goes to the diamond 255 which poses the query as to whether the queue then includes a background task. The program would reach the same step after placing a scheduled message or task in the queue from box 254.

The program has two classes of tasks that it can perform. These include the background tasks, which the program looks for in the diamond 255. It also has the foreground tasks, encountered in the diamond 256, which it will not reach until after looking for the background tasks. As the relative priority of the diamonds 255 and 256 indicate, the performance of a background task has greater priority over the performance of a foreground task. The actual tasks that fall into the background and foreground classes appear in TABLE 1.

TABLE 1

Background and Foreground Tasks

| Foreground Tasks | Background Tasks |
|---|---|
| 1. Set up assay | 1. Run assay |
| 2. Set up protocol | 2. List protocol |
| 3. Request management data | 3. Print management data |
| 4. Change protocol | 4. Print protocol instructions |
| 5. Initiate calibration | 5. Calibrate |
| 6. Request list of assays | 6. Print list of assays |
| 7. Display of time | 7. Display scheduled messages |
| 8. Check time of scheduled tasks (e.g., daily calibration) | 8. Reset on initial application of power |
| 9. Diagnostic procedures | |
| 10. Delete assay | |
| 11. Add protocol | |

The foreground tasks involve communication between the operator and the microprocessor. In the first such task, the operator informs the instrument as to the desired assay and gives the required information. In the second, he gives the required protocol or set of instructions, for an assay.

Most of the other foreground tasks require very little explanation, if any. However, in the eighth, the instrument requests the time at which a regularly occuring task will occur. For example, it may want to know the daily time for automatic calibration. The ninth procedure relates to procedures for determining problems in the instrument's operations.

Background tasks occur without communication with the operator. A prior communication with the operator may have occurred as a foreground task. Thus, setting up and initiating an assay represents a foreground task; the actual running of the initiated task constitutes a background task.

Returning to the diamond 255, if the queue has one or more background tasks waiting for performance, the program moves to the box 257. This induces the performance of the background task waiting first in the queue. The performance of this task continues until any of three possible events occur. First, the instrument may actually complete the task undertaken at box 257. In this instance, it returns to the diamond 255 to ask if a further background task remains in the queue to undergo execution.

Second, instead of completing the task, the program may find that the background task includes a certain period of idle time insofar as concerns the microcomputer. The time for the elevator-transport mechanism 59 to move along the steel bar 160 represents one such idle period. During an idle period, the microcomputer can perform other tasks. Accordingly, the program returns, during the idle time, from the box 257 to the diamond 255 and allows the performance of additional tasks during the idle period encountered in particular background tasks.

Third, the ten millisecond period created by the clock shown in circle 251 may expire. When that happens, the program starts the entire procedure over. When thus interrupted by the real-time clock, the program returns from the performance of whatever background task it had begun in teh box 257 to the step of updating the clock in box 252. The interrupted background task will remain unfinished until the program proceeds through the diamond 253, the box 254, the diamond 255 and to the background task in box 257.

The queue may include no background task when the program reaches the diamond 255. Or, it may have performed all of the background tasks in the queue through the box 257 and returned to the diamond 255. In either case, the program next moves to the question diamond 256 and asks if the queue includes any foreground task. As stated above, the foreground tasks have less priority than the background tasks.

If, at the diamond 256, the program finds a waiting foreground task, it moves to the box 258 to initiate the first foreground task in that queue. The program permits the continued performance of the foreground task until, like the background tasks in box 257, any one of three events occur.

Naturally, the instrument may actually finish the the foreground task. Second, the foreground task may reach a period of idle time which does not require the active intercession of the microcomputer. In either event, the program returns to the diamond 255. When it does so, it does not ask whether the queue contains a foreground task; rather, it returns to see if it has a background task, which the queue may have received during the time of performing the foreground task in box 258. Even here, the program will not permit the performance of a foreground task until all background tasks which may have entered the queue have undergone performance.

Third, the beginning of the ten millisecond cycle at the circle 251 will interrupt any foreground task then proceeding. In that case, the program returns to updating the clock shown in box 252. The foreground task interrupted at this time must wait until the program proceeds all the way back through the question box 256. Only then can it finish or proceed further on the performance of the foreground task thus interrupted.

Regularly, the program completes all background tasks in the queue, moves beyond the diamond 255, and performs any foreground tasks at the diamond 256. For any time remaining in the ten millisecond period established in circle 251, it then runs a memory test.

The memory test appears in the box 259. It continues until the real-time clock interrupts it and returns the program to the step of updating the clock at box 252. The test runs for all of the spare time in the ten millisecond period in which the operating system has no other task to perform.

In the memory test indicated at box 259, the program looks at each location in the memory. The particular location, under scrutiny, as do the other locations, includes eight bits of information. The memory test first places the eight bits of information into a temporary storage. It then writes the binary number 10101010 into the memory location. The test then looks at the number placed into the location undergoing testing to see that in fact it gives back the number 10101010.

The test then reverses the bits in the test number and writes them to the location undergoing testing. It then reads the location to make sure that it provides back the same number 01010101. Upon a successful conclusion of the test indicating no problems, the original number stored elsewhere returns to the tested location. If the test discovers a problem, it alerts the operator.

The memory test proceeds through each location in memory sequentially. It may be interrupted by a new ten millisecond operation period and, perhaps, the performance of a background or foreground task. When spare time arrives, however, the memory test will continue where it left off; it goes to the next location in the memory.

FIG. 14 diagrams the portion of the program that comes into operation when initially applying power to or turning on the instrument. The program segment shown in FIG. 14, as do the other flow diagrams discussed below, receive performance according to the real-time operating system shown in FIG. 13.

When first turning on the instrument, the program performs the first background task, which appears in the box 263. Specifically, the operating system determines in diamond 255 that the queue includes the background task of box 257. The system then performs this background task.

The program, at step 263, raises the fingers to their upper position as determined by the optical sensor 143. It also moves the elevator-transport assembly 59 to its home position using the optical sensor 185.

Lastly, the subroutine checks to ascertain that neither component has jammed. Specifically, it allocates a period of time for the fingers and the elevator-transport assembly 59 to reach their home positions. If, by the expiration of the alloted time, either component has failed to reach its assigned position, the program alerts the operator.

The program, at box 264, next ejects any sample trays from the front and rear pinion gears 39 and 40. Again, it checks for jams by allocating a period of time for the task. Naturally, it checks to make sure that the instrument has, in fact, performed the operation within the period of time.

The program, in box 265, next checks to see whether the fingers 57 and 58 have a sample tube in their possession. If so, it gives the tube to the operator. It does so by providing a message that the operator should place an empty sample tray in the rear channel 23. When the operator has done so, the subroutine moves the tray into a position where it receives the sample tube from the fingers.

Subsequently, or if the fingers did not contain a sample tube at the box 265, the program causes the printing of the word "ANSR" as shown in box 266. After performing the tasks in the boxes 263 and 266, the programn in box 267 then obtains the date and time from the operator. This step constitutes a foreground task since it involves a communication with the operator. As such it awaits the completion of all of the background tasks shown on the left of FIG. 14. After completing all of the startup tasks in the boxes 263 to 267, the program segment cancels the task in the queue, as shown in box 268. From there it returns, in box 269, to the real-time operating system.

Figure 15:
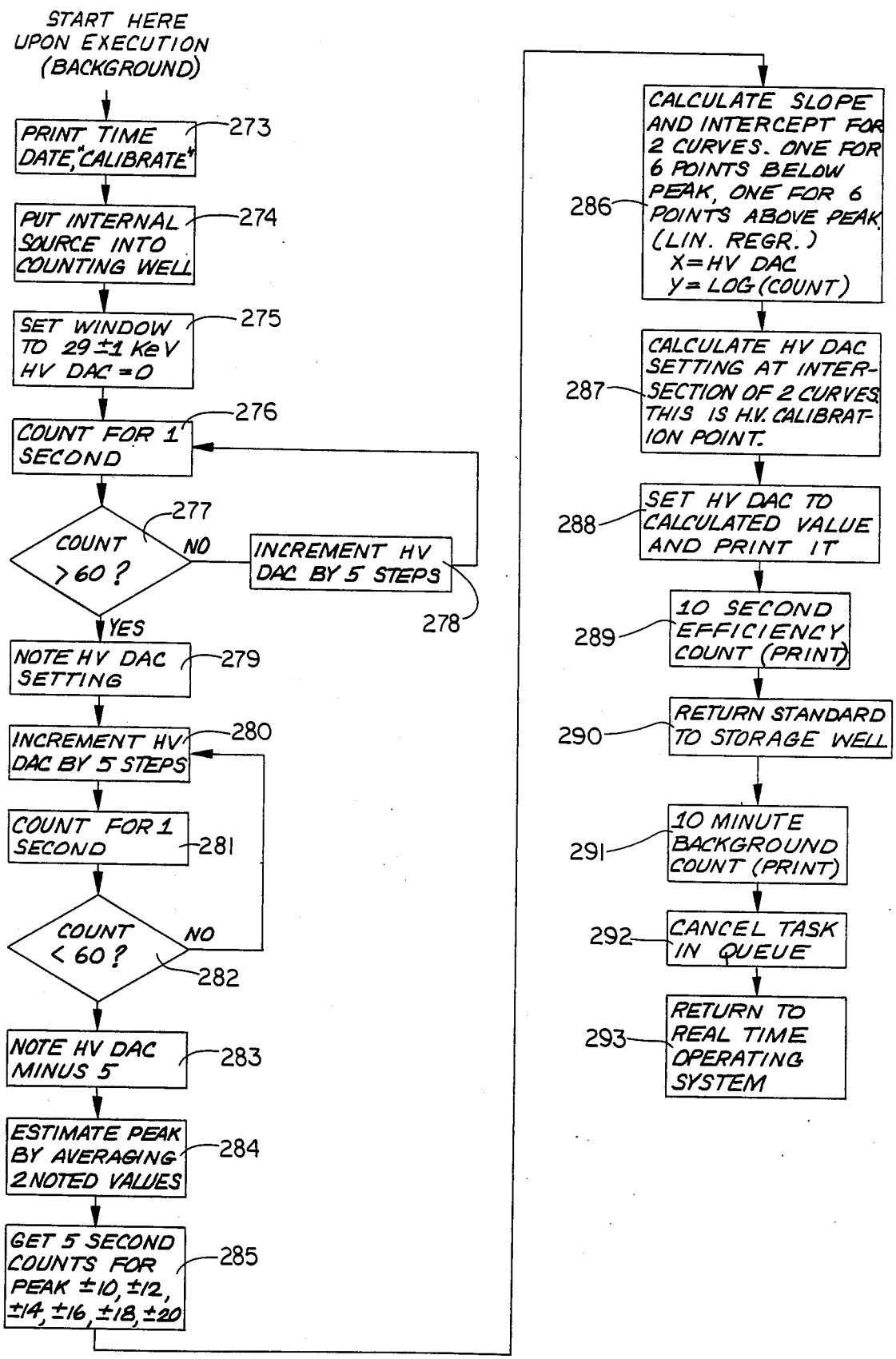
FIG. 15 provides a flow diagram for the program for the automatic calibration of the instrument.

The program segment shown in FIG. 15 calibrates the instrument. The actual performance of the calibration program segment arises in one of two ways. First, calibration represents a scheduled task contained within the computer's memory. Thus, at the preappointed time, as indicated by the diamond 253 in FIG. 13, it becomes a scheduled task and enters the queue in the box 254. The scheduled time generally falls during a time of less use of the instrument.

Second, upon the initial application of power to the instrument, the computer will not permit the running of an assay until it has undergone a calibration. This does not require the operator to push the "calibrate" button on the front panel 30 shown in FIG. 1. The instrument does it automatically when an assay is selected.

The interfacing between the operator and the computer represents a foreground task. In other words, when the realtime operating program in FIG. 13 arrives at the diamond 256, it will determine that a foreground task waits for performance. It will then travel to box 258 to carry out the foreground task of determining that the operator has pushed the "calibrate" button. As a second portion of this foreground task, it will put the program found in FIG. 15 into the queue as a background task. The program orders the performance of the actual background task calibration in the appropriate order as shown in FIG. 13.

As discussed below, with regards to FIG. 17, the instrument will not perform an assay if selected by the operator on the panel 30 after a time that it should undergo a calibration. Thus, after the operator first turns on the machine, it must calibrate before it will perform an assay. Similarly, after the particular time of day, generally 5:00 a.m., the machine must also calibrate itself, which it will do automatically, before it will run an assay first requested after that time.

Whichever of the two events causes the instrument to initiate a calibration, the program for doing so appears in FIG. 15. It starts at box 273 with the printer 27 setting forth the time of day, the date, and the word "calibrate". As the next step, shown in box 274, the program causes the fingers 57 and 58 and the elevator-transport mechanism 59 to move the internal standard source 191 from its holding position 192 to the detector 194.

The internal sample 191 incorporates the $I^{129}$ nucleus. This moiety undergoes radioactive decay to produce gamma particles having an energy of 29 KeV.

As part of its interface electronics, shown in box 241 in FIG. 12, the instrument includes a pulse height analyzer (PHA). This permits the counting of particles having an energy falling within a predetermined range or "window". The calibration program segment, in effect, sets this window at 29±1 KeV. In other words, it will allow the counting of particles having an energy from 28 to 30 KeV.

The photomultiplier tube 194 which receives the photons produced by the gamma particles of the sample has an initial voltage of about 800 volts applied to it. The microcomputer, however, can increase this voltage on the photomultiplier tube through a digital-to-analog converter (DAC). Specifically, the microcomputer can cause the DAC to increase the voltage on the photomultiplier tube by anywhere from 1 to 256 DAC units of approximately 1.2 volts each. Thus, the photomultiplier voltage may increase in steps of 1.2 volts from 800 to 1100 volts. As stated above, the calibration subroutine, at box 275, initially sets the digital-to-analog converter to zero so that the photomultiplier experiences about 800 volts.

More accurately speaking, the pulse height analyzer receives approximate settings for the lower and upper limits of its window. At a "convenient" voltage applied to the photomutiplier tube, the range will correspond to 28 to 30 KeV. for the window. The calibration scheme in FIG. 15 ultimately determines the exact setting of the DAC and, thus, the voltage on the PM tube which will result in the previously established limits placed on the PHA creating a window of 28 to 30 KeV. Changing the DAC setting by predetermined amounts will then bring other energy ranges into the PHA's window.

With the initial conditions of the PM tube and the PHA thus established, the program permits, at box 276, the detector to count the particles from the standard source 191 for one second. Specifically, it counts the particles which, with the photomultiplier having an impressed voltage of about 800 volts, create voltage pulses falling within the PHA's window. As a practical matter, with the photomultiplier tube having an impressed voltage of 800 V., its output, resulting from the $I^{129}$ gamma particles, falls below the PHA's window.

Specifically, the pulse height analyzer will not count a minimum of 60 particles in the one second period in response to the question posed by the diamond 277. As a consequence, the program increases the setting on the DAC by five steps as indicated in the box 278. This tends to increase the magnitude of voltage pulses from the PM tube and bring them closer to the PHA's window. After incrementing the high voltage DAC by five steps, the instrument again counts for one second at step 276. The procedure continues until the one-second count from the PHA exceeds 60. The routine (at box 279) notes the high-voltage DAC setting where the count first exceeded 60. This DAC setting indicates the general beginning of the peak from the $I^{129}$ nucleus.

The instrument then begins to look for the end of the $I^{129}$ peak. It does so at box 280 by again incrementing the DAC setting on the PM tube by five further steps. The instrument, at step 281, continues its one-second countings. At the end of each such one-second period, the program inquires as to whether the PHA count for that period has fallen below 60 at the box 282. If not, the $I^{129}$ peak still falls within the PHA's window.

Looking for the end of the $I^{129}$ peak, the program continues to increase the DAC setting by five further steps, at box 280, until the one-second count, at box 281, falls below 60. When that happens, the program at the box 283 notes the particular DAC setting immediately before the setting at which the count fell below 60. This represents the last DAC setting actually within the $I^{129}$ peak.

The instrument then makes a preliminary estimate of the DAC setting which would bring the center of the peak within the PHA window. It does this at box 284, by averaging the first DAC value, noted at box 279, and the last DAC setting, noted at the box 283.

The program then directs the instrument to count for longer periods at selected points on either side of the preliminary peak, which represents the midpoint of the range determined at the box 284. In particular, the DAC selects six points on either side of the range's midpoint. It specifically selects ten, twelve, fourteen, sixteen, eighteen, and twenty DAC units on both sides of this temporary peak. At each of these twelve settings, the program, at box 285, directs the detector to count for a five-second period.

The measurements at these twelve settings of the DAC will form the basis for determining the actual center of the $I^{129}$ peak. Accordingly, the instrument counts at the settings for the longer period of five seconds to improve the reliability of the results. This compares to the one-second counting period used to obtain the range's estimated midpoint at the boxes 276 and 281.

At the box 286, the program fits a straight line to the six points on one side of the temporary peak. Specifically, it uses the linear regression technique to fit a calculated straight line to the plot of the DAC settings against the log of the number of counts at each such setting. The program, still at box 286, also curve-fits a straight line to the counts obtained at the six points on the other side of the temporary peak. Of course, it uses the same technique for the six points as on the other half of the range.

The program then determines, at box 287, the intersection of the two lines determined by the linear regression technique. The intersection of the two curves represents the $I^{129}$ peak and, thus, the high voltage calibration point for the known sample. In other words, the program decides that the DAC setting at the intersection of the two curves represents the peak's actual center for the known $I^{129}$ sample. This DAC setting at the intersection point of the two curves specifically represents the energy of 29 KeV. of the $I^{129}$ nucleus.

After determining the calibration point, the program sets the high voltage DAC to this value. It also prints the value on the printer 29 as stated in box 288.

To determine that the instrument actually operates properly, the program provides for a ten-second count at the DAC setting determined to lie at the middle of the $I^{129}$ peak. It then, in box 289, prints this particular count. The operator may then determine whether the instrument has demonstrated a satisfactory performance. With the calibration thus completed, the program causes the transport mechanism to return the standard to the standard holder 192 at the box 290.

The instrument, at the box 291, performs a ten-minute background count with no sample holder in the detector well. However, the program brings the transport-elevator assembly 59 and the fingers 57 and 58 to the well 60 and places them in the position they occupy when they hold a sample holder within the well. Thus, any radioactive material that may have accidentally spilled on the fingers constitutes part of the background count. This, of course, accords with the configuration the instrument occupies when it actually counts a sample. The background count is subsequently subtracted from an assay count to give a result for the sample free of background interference.

Lastly, the subroutine cancels the task in the queue as shown in box 293. It then returns to the real-time operating system at box 294.

Figure 16:
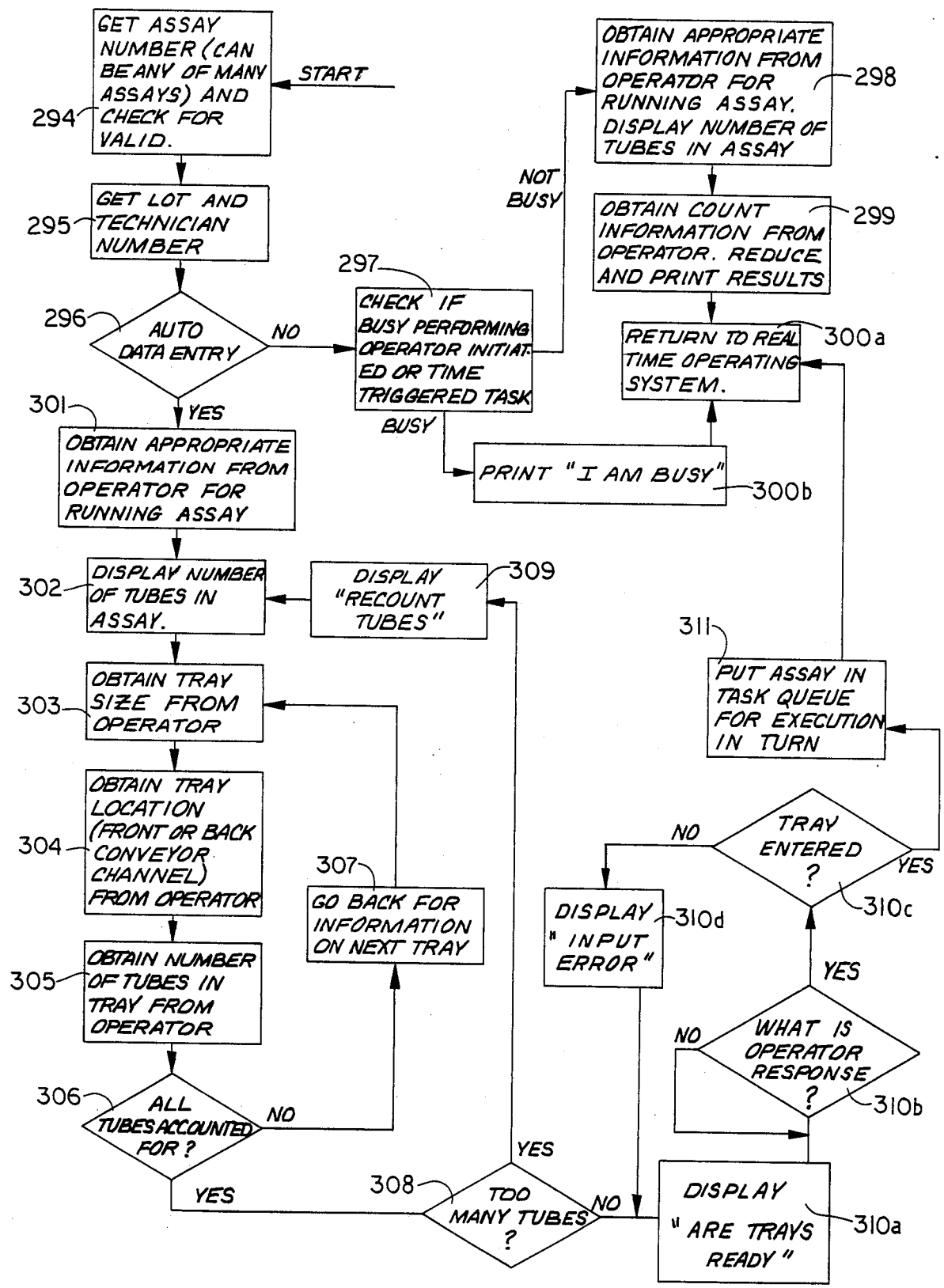
FIG. 16 has a flow diagram for the program for the entry into the gamma counter by the operator of information required for the running of an assay.

FIG. 16 illustrates the steps that allow the instrument to obtain from the operator the information required for an actual assay. The programming and computational facilities of the instrument allow it to calculate the final results of an assay from the raw data. The program can perform this task for an analysis where it has obtained the data or for information provided by the operator. In the latter situation, the instrument itself does not perform a physical measurement.

The subroutine starts at the box 294 by asking the operator to provide the particular identification number for the assay he desires the instrument to perform. Naturally, the instrument shown in the prior figures can perform several assays. Each one has its own identification number. After the operator enters one of these numbers, the instrument checks for the validity of the number to make sure it corresponds to the identified number of an actual assay. It also asks, as preliminary information, for the lot number and the identification of the technician at box 295.

At the diamond 296, the program asks whether it should revert to the "auto data entry" mode. In other words, it asks if the instrument should itself automatically obtain the data for the computational obtention of the final result; it does this by performing the analysis itself. If not, the operator must provide the raw data from prior actual physical measurements. Before doing this, the program, at box 297, determines whether the real-time operating system has another task under performance. This could be an operator-initiated task or an operation automatically performed at a particular time.

When the program determines that the operating system does not have prior tasks in the queue, it moves to box 298. There it obtains the appropriate information from the operator to perform the desired computations for the assay. It also displays on the LED or preferably vacuum fluorescent panel 32 the number of tubes required for the assay. The operator, at the box 299, must then provide the count information that he obtained from separate physical measurements. The program then computes and prints the desired result at box 299. After providing the computational results, the subroutine, at box 300a, returns to the real-time operating system.

If, at box 297, the program finds the instrument preoccupied with other tasks, it prints the friendly message "I AM BUSY" at the box 300b. It then returns to the realtime operating system at the box 300a. The operator must then try again later for the instrument's assistance.

As the other alternative, the operator may wish for the instrument to perform the actual physical measurement required for the analytical results. In this instance, the program goes from the diamond 296 to the box 301 and obtains the information to run the assay. This includes such data as the assay desired, the number of unknowns, and the like. The subroutine next goes on to display on the LED or vacuum fluorescent panel 32 the number of tubes required for the assay at box 302.

The program also asks for various items of information from the operator. This includes the tray size at the box 303, whether the tray sits in the front or the rear conveyor at box 304, and, in box 305, the number of tubes carried by the particular tray. At diamond 306, the program determines whether the tray contains a sufficient number of tubes for the particular analyses selected. If not, the program determines whether the succeeding tray contains the remaining tubes. It does so at the box 307 which directs the program to obtain information on the succeeding tray at boxes 303 to 305.

Additionally, the operator may have indicated more tubes in the sample tray than required for the selected assay. The diamond 308 determines whether this, in fact, has occurred. If so, the expression "RECOUNT TUBES" appears on the display 32 as shown by the box 309. The program then repeats the entire portion of the subroutine which determines the number and the propriety of the number of tubes for the assay selected. This includes the boxes and diamonds 302 to 308.

If the tray contains an appropriate number of tubes for the assay, the program moves to box 310a and displays the message "ARE TRAYS READY" on the panel 32. The question of the operator's response to this query arises at the diamond 310b. If the operator does not indicate the tray's readiness, the program waits there.

When the operator tells the program that the tray occupies a state of readiness, the instrument then attempts to move the tray, through the pinion gear 39 or 40, into its operational position. At the diamond 310c, the program looks to see if the tray has achieved its correct operational position. It does this by determining if the leading tab 50 on the tray has interrupted the opto-sensor 53 or 54. If so, the tubes in the tray's front row lie on a line where the fingers 57 and 58 may grip them and the elevator-transport mechanism 59 may move them to the counting well. The program, at the box 311, then puts the actual assay into the background queue for execution in its normal turn. The program then returns to the real-time operating system at the box 300a.

The operator may accidentally place the tray on the channel 22 or 23 backwards. In other words, the front row will pass last over the pinion gear 39 or 40. In this situation, the tabs 50 fall on the wrong side of the channel 22 or 23 and cannot interrupt the appropriate photosensor 53 or 54. Or, the operator may not shove the tray sufficiently close to the pinion gear 39 or 40 for the latter, when rotating, to move the former.

In any event, the instrument only allots five seconds of rotation of the pinion gear 39 or 40 for the tab 50 on the tray 21 to interrupt the sensor 53 or 54. If, at that time, the appropriate sensor 53 or 54 remains free of any tab, the program, at the box 310d, displays the phrase "INPUT ERROR" on the vacuum fluorescent panel 32. It then returns to the box 310a to give the operator another chance to correctly load the tray.

Figure 17:
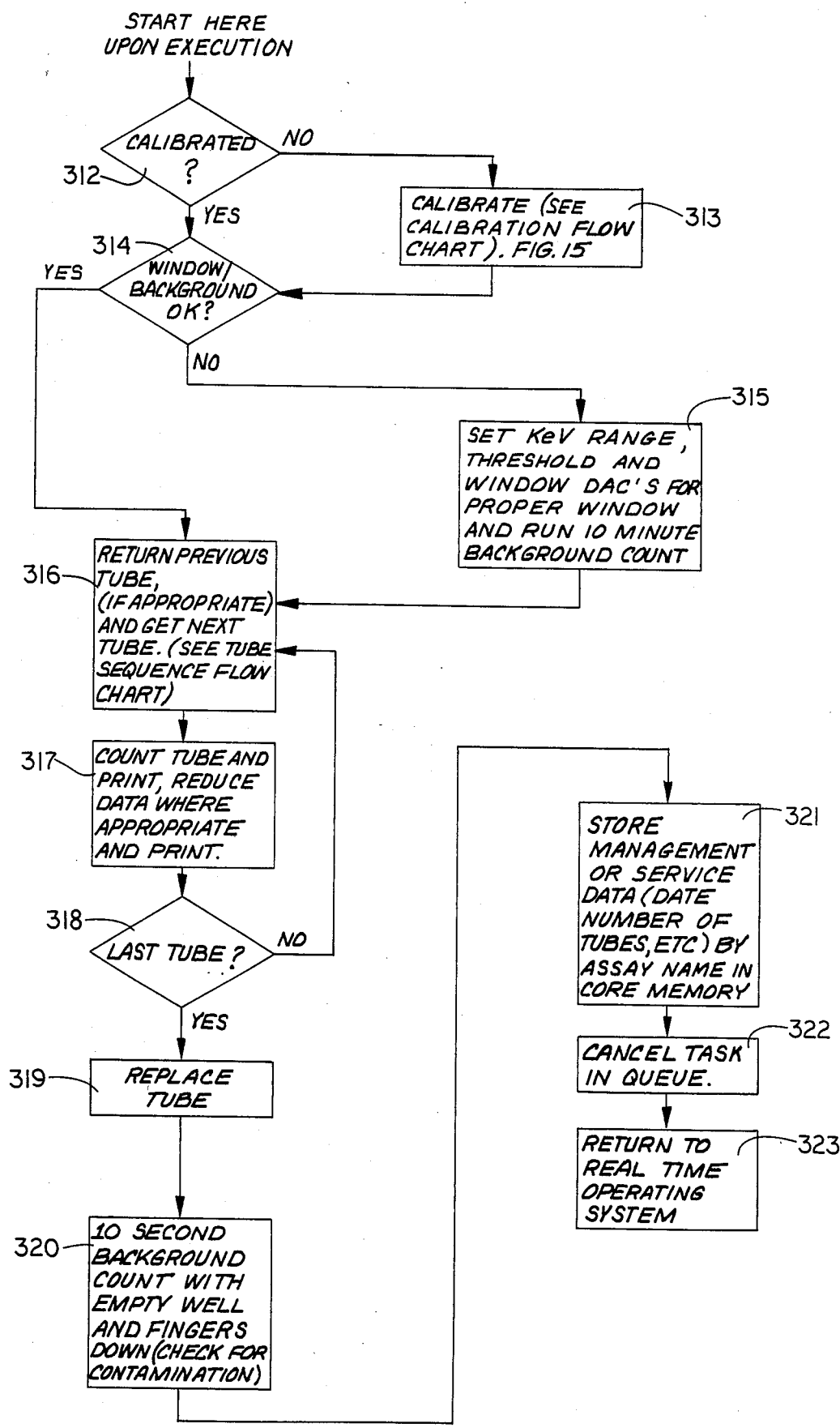
FIG. 17 gives a flow diagram for the running of an assay in which the instrument automatically performs the actual physical measurements.

The actual running of an assay appears in FIG. 17. Immediately upon the real-time operating program reaching the assay, the diamond 312 asks whether the instrument has undergone calibration. This procedure appears, of course, in FIG. 15 as discussed above. The program specifically requires calibrations upon the occurrence of either of two separate events.

The first involves the automatic calibration of the instrument at about the same time each day. The instrument's memory includes instructions that at a particular preset time of day, the instrument should automatically calibrate itself. Until completing the calibration, the instrument will not perform any assay selected on the panel 30 after the preset time.

Secondly, the instrument will not perform an assay whenever it is turned on without undergoing a calibration. Thus, plugging and unplugging the instrument or simply turning the switch 36 off and on will require a calibration prior to the running of an assay.

While the instrument calibrates itself, it can still communicate with the operator. Thus it can receive and store instructions as to assays the operator wishes to have performed.

If the instrument has not undergone a calibration at the diamond 312, it does so at the square 313. In any event, the instrument, at the diamond 314, will then determine whether the PHA's window and the background count appear acceptable. If not, the program requires the instrument, at the box 315, to set the PHA's KeV. range; this includes the lower threshold and the magnitude of the range above that. Furthermore, the instrument must also run a ten-minute background count.

After setting of the window and obtaining the background count, if necessary, the subroutine, at the box 316, returns the previous tube if still within the counting well 60. Following the steps shown in FIG. 18, it obtains the next sample tube.

The program then moves to box 317, where it actually performs the physical counting of the gamma particles produced by the sample in the tube. Furthermore, when indicated by the procedure for the assay, the program reduces the data and prints the results.

At the diamond 318, the program asks whether the particular tube within the counting well 60 represents the last tube for the assay. If not, it repeats the steps shown in boxes 316 and 317 as many times as required by the particular assay.

If the detector contains the last tube in the assay, then the program, at the box 319, replaces it within the tray. It then, at the box 320, takes a ten-second background count with an empty well. Moreover, as discussed above for the background count, it brings the fingers into the position in which they would hold a sample holder within the detector well 60. This checks to determine if some radioactive material has attached to the fingers or fallen within the sample well.

The instrument's memory can retain quality control, management, and service data on the tests it has performed. By correctly recalling information on the front panel 30, the operator or the instrument's owner can learn of the particular instrument's use patterns. After storing the management data in the memory at the box 321, the program then cancels the task for the assay in the queue at box 322. It then returns to the real-time operating system at the box 323.

Figure 18:
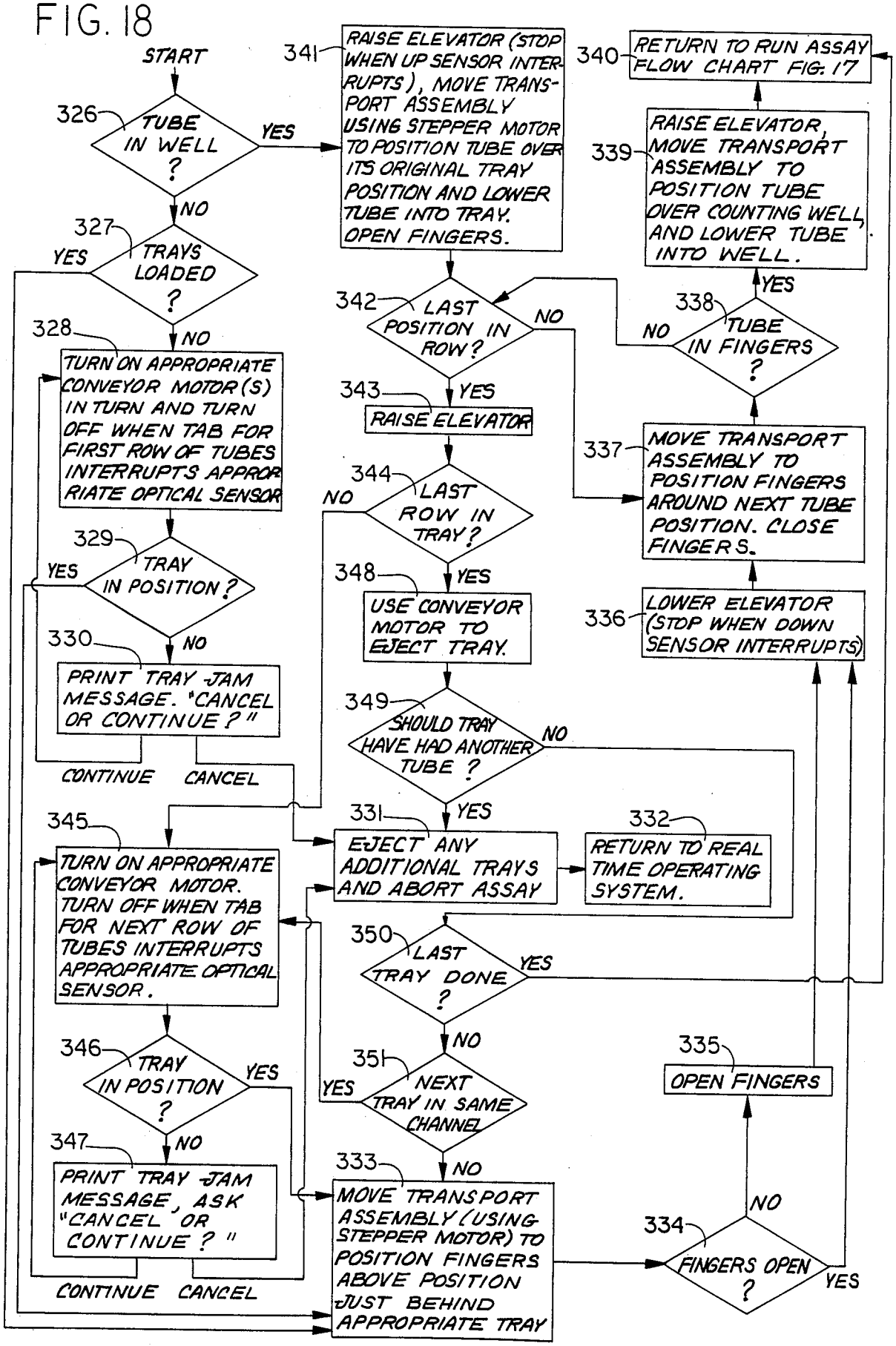
FIG. 18 includes the flow diagram for the operation of the conveyor, transport, elevator, and finger mechanisms which, together, grip and move the sample tubes.

FIG. 18 shows the program which actually conveys tubes from the trays 21 to the sample well 60. This differs from the subroutine shown in FIG. 14 which diagrams the instrument's operation during the initial turn-on procedure. In contrast, FIG. 18 shows the operation of the same components during the instrument's normal, continuing operating.

To place a particular sample tube into the well, the program at the diamond 326 begins by asking whether a tube already sits within the well 60. A "NO" answer indicates, of course, that the well, at that time, remains empty. This moves the program to the diamond 327. There it asks whether the conveyor gears 39 and 40 have loaded sample trays in the two channels 22 and 23 into positions where the fingers 57 and 58 on the elevator-transport mechanism 59 can reach them. If not, the program, at the box 328, turns on the appropriate conveyor motor 41 or 42 to properly position the trays in the channels. The motors continue to operate until the leading tab 50 on the tray 21 interrupts the appropriate optical sensor 53 or 54. The first tab corresponds to the first row of tubes in the tray. The interruption of the optical sensor signals the program to turn off the conveyor motor.

At this point, the program asks, at diamond 329, whether, in fact, the tray or trays have reached their appropriate position. If they have, the program may then proceed to remove a sample tube from the tray. However, if the conveyor motor turns off but a tray does not occupy the correct position, then a blockage may have occurred in one of the channels. Or, the operator may have placed a tray in the channel 22 or 23 backwards. The components 310a to 310d of FIG. 16 discuss this possibility.

As shown in FIG. 1, the channels 22 and 23 have the barrier 28 at their left or downstream end to prevent the trays from dropping off the instrument. The instrument may receive a large number of trays in the channel. As it processes the tubes in the trays, it will move the trays to the left in FIG. 1. It can then receive further trays. At some point, unless the operator removes a tray from the left of the elevator-transport housing 24, the conveyor will force the tray train into the barrier. The abutment of the lead tray against the barrier 28 will prevent the conveyor's pinion gear 39 or 40 from moving the trays any further. Thus, the conveyor motor 41 or 43 cannot cause a tab 50 on the tray 21, which at this point remains motionless, to interrupt the sensor 53 or 54. Thus, the instrument does not receive an indication that a further row in the tray has come into the proper operating position.

The program keeps track of the amount of time that the conveyor motor 41 or 42 operates or attempts to operate without any tab interrupting the photosensor 53 or 54. An excessive period of time, generally greater than five seconds, indicates the jammed situation. When this occurs, the program, at box 330, prints the message indicating that a tray jam-up has occurred. It then asks the operator whether he wishes to continue or to cancel the assay.

Presumably, if the operator wishes to continue, he will alleviate the problem causing the jam. At this point, he pushes the "continue" button on the front panel 30 which returns the program to the box 328. It also allows the conveyor motor 41 or 42 to resume its task of moving a tray into position.

If the operator pushes the "cancel" button, the program, at the box 331, ejects any additional trays within the channels and stops the assay. It then, at the box 332, returns to the real-time operating system shown in FIG. 13.

Eventually, in the the successful running of an assay, a tray 21 will come into its proper position. When this occurs at diamond 329, the program moves to the box 333. There, it causes the transport motor 175 to position the fingers behind, or astride, of the appropriate tray as indicated by the box 333. The program also reaches the box 333 from the diamond 327 if, at that juncture, a tray has already found its operating position.

The program, at diamond 325, asks whether the fingers occupy their open configuration. If not, the fingers then open at the box 335. In either event, the subroutine moves to box 336 which lowers the elevator until the fingers occupy their lower position. At this position, the fingers have descended sufficiently to grab a sample tube within the tray. The program determines that the elevator motor 136 has lowered the fingers 57 and 58 to their lower position when the "down" photosensor 149 becomes interrupted. However, since the fingers 57 and 58 now sit to the side of the tray, no tube sits between the fingers 57 and 58; the fingers have to first move transversely before they they reach and can grip a sample tube.

With the fingers at their lower position and in their open configuration, the elevator-transport assembly 59, at the box 337, positions the fingers around the next tube position within the tray. Regardless of whether that position actually holds a tube or not, the program closes the fingers. If a tube does occupy that position, the fingers, of course, grip that tube.

As shown by the boxes and diamonds 333 to 337, the elevator-transport mechanism 59 does not lower the fingers 57 and 58 while directly over a position for a sample tube within a tray. If that position actually carried a tube, the program prevents the fingers from descending directly down on top of the tube. Instead, at box 333, the transprot motor 175 moves the fingers to the side of the tray. At the box 336, the elevator motor 136 then lowers the fingers 57 and 58. The fingers next move laterally, at the box 337, to a sample tube position over the tray.

The program proceeds in this fashion to avoid colliding the fingers 57 and 58 into a sample tube from above and possibly damaging it. The potential damage includes chipping the top edge of the tube or breaking it entirely. The potential for damage becomes increased since the top of the tube can have the greatest displacement from the center of the tube's position within the tray. This can occur since the sample tube may lean at a slight angle from the vertical. The top, or free, end of the tube, when this happens, as it does normally, most likely would not then fall directly underneath the descending fingers.

The program instead causes the fingers 57 and 58 to approach the sample tube from the side rather than from above. Located at a lower height, it encounters the tube's middle, which has less displacement from the center of the tube's position within the tray. Furthermore, if the tube leans to either side of the row, the fingers, as discussed in FIGS. 4a and 4b, gently nudge it back into an upright position. Thus, the fingers approaching a tube from the side avoids the damage to the tube that could result if the fingers descended directly from above the tube.

When the fingers actually close, the program, at the diamond 338, inquires whether the fingers have actually gripped a tube. It determines the answer from the information provided by the photosensor 86, as discussed above. If not, the fingers have actually closed over an empty position within the tray and the program follows a segment discussed below.

If the fingers have closed upon a tube, then, at the box 339, the elevator-transport assembly 59 moves the tube to the position over the counting well 60. The elevator motor 136 then lowers the tube into the well at the box 339. The program then returns to the chart of FIG. 17 for running the actual assay as shown at the box 340.

At the beginning of the program of FIG. 18, the diamond 326 asked whether the counting well 60 actually contained a tube. The remainder of the discussion to this point has concentrated upon the situation in which the well 60 contained no such tube.

However, if a tube does sit within the well at the diamond 326, then the program moves to the box 341. For the next portion of the program, it becomes important to remember that the fingers 57 and 58 continue to grip the tube all the time it sits within the well 60. Accordingly, at the box 341, the fact that the well contains a tube signifies that the fingers remain in contact with that tube and have a location, of course, over the well 60.

Having determined that the well contains a tube, the elevator raises the tube until the tab 142 interrupts the photosensor 143 in FIG. 5. At this point it stops, having removed the sample from the counting well. The transport motor 175 then moves the sample tube to a location directly over the position in the carrier tray from whence it came when commencing its journey to the counting well 60. The elevator then lowers the tube back into the tray. Lastly, the fingers open to release the tube and allow it to remain within the tray. All of this occurs at the box 341.

The fingers then move to another tube upon which the instrument will perform a measurement. In seeking the position of the next tube, the program, at the diamond 342, asks whether the tube just replaced by the fingers occupied the last position in a row within the tray. If not, then the fingers, while open and at the lower height, move to the next tube in the row, as shown in the box 337, discussed previously. In order to do this, the elevator-transport assembly 59 simply slides the fingers 57 and 58 to the next tube position in the row.

The fingers then close. As above, the program at the diamond 338 asks whether the closed fingers actually grip a tube. If so, then, at the boxes 339 and 340, the program moves the tube to the counting well and returns to the assay flow chart. If the fingers do not grip a tube, the program returns to the box 342; then they may move to a position within a tray actually carrying a sample tube.

The position from which the fingers move may actually represent the last position in a row within the tray. In this case, the fingers cannot merely slide along a row at the same height to a further tube position as they did in the box 332. Consequently, the fingers, when at the last position within a row, must raise at the box 343.

The diamond 344 then inquires whether the row lying under the fingers constituted the last row within the tray. If not, then the conveyor motor 41 or 42, at the box 345, will move the next row within the same tray to a position underneath the fingers.

Similar to the boxes 328 and 330 and the diamond 329, the program, at the diamond 346, asks whether a tray has moved into position with a row of its tubes underneath the fingers 57 and 58. If not, then a jam has occurred which the program determines through the lapsing of the five-second period without the sensor 53 or 54 receiving a further tab. At the box 347, the tray jam message appears on the LED display 32 and the operator is asked if he wishes to cancel or continue. To continue, the operator must correct the jammed situation and tell the instrument to continue on the front panel 30. This turns on the appropriate conveyor 41 or 42 at the box 345 to bring the tray into position.

Should the operator, at the box 347, cancel the assay, the program ejects the trays and aborts the assay at the box 341. The program subsequently returns to the realtime operating system of FIG. 13 shown at the box 332.

The diamond 346 may determine that the conveyor motor 41 or 42 has moved the tray into operating configuration. The program then moves the elevator-transport assembly 59 to position the fingers to the side (or rear) of the tray and lowers them, at the box 333. The subsequent discussion as to the fingers opening, moving sideways, and obtaining a tube proceeds as described above with the boxes 334 to 339. Eventually, a tube sits in the counting well 60 and the program runs the actual assay indicated at the box 340.

When bringing a new row of tubes into position underneath the fingers 57 and 58, the program, at the diamond 344, asks whether the previous row constituted the last row in the tray. The previous discussion subsequent to the diamond 344 presumed that the tray had at least one additional row which could supply a sample tube. If not, then the program must find its further sample tubes in subsequent trays.

It begins the process by turning on the conveyor motor 41 or 42, at the box 348, to eject the tray which has run out of sample tubes. Then, at the diamond 349, it inquires as to whether, in fact, that tray should have contained a further tube. If it should but did not, a problem exists within the running of the assay. In this eventuality, the program, at the box 331, ejects all of the trays, aborts the assay, and, at the box 332, returns to the real-time operating system.

Alternatively, at the diamond 349, the completed tray should not have contained another tube. In that case, the program asks, at the diamond 350, whether the instrument has assayed all of the trays for which the operator has selected an analysis. If the instrument has performed on all of the trays, the program then returns to the chart of FIG. 17.

If the channels contain additional trays, the program, at box 351, asks whether the further tray lies in the same channel as the last tray analyzed. If so, the conveyor motor for that channel moves the succeeding tray into position at the box 345 and follows the subsequent program discussed above.

Should the subsequent tray lie in the other channel, then no need exists to load the further tray. The program, at the diamond 327 and the following program segments at the beginning of FIG. 18, had already loaded the trays in both channels. Accordingly, at the box 333, the program may proceed to position the fingers to the side of the succeeding tray in the alternate channel and obtain a sample tube. Following the components 334 to 339, the program places a sample tube from the alternate tray into the counting well and returns, at the box 340, to the run assay flow chart of FIG. 17.

Accordingly, what is claimed is:

1. In an analytical instrument having detector means for performing an analysis upon a sample contained in a sample holder, the improvement comprising:
   (A) carrier means for holding a two-dimensional array of a plurality of sample holders in a plane;
   (B) conveyor means for moving said carrier means along a path in a predetermined first direction lying in said plane so that all of said sample holders in said carrier means pass between two predetermined points, said carrier means, while being moved by said conveyor means, remaining separated from said detector means by at least a nonzero predetermined distance in said plane;
   (C) motive means, separate from said conveyor means, for moving a single sample holder having a location on a line connecting said two points and lying in said plane and nonparallel to said first direction in a second direction from said location to said detector means, said second direction, in said plane, having a nonzero component of motion nonparallel to said first direction, said motive means, while moving said single sampler holder, not moving any other of said sample holders in said carrier means; and
   (D) aligning means, coupled to said conveyor means, for indicating to said conveyor means when each of said sample holder has reached said location on said line.

2. The improvement of claim 1 wherein said motive means includes transport means for moving said sampler holder horizontally in said second direction and elevator means, coupled to said transport means, for lifting a sample holder having a first height in said plane to a second height above said plane and lowering said sample holder from said second height to about said first height.

3. The improvement of claim 2 wherein said elevator means and said transport means are located above said plane and further including support means having a horizontal member lying in said second direction to which said transport means translationally couples and first and second vertical supporting members, rigidly coupled to said horizontal member, said first vertical supporting member being located on one side of said path of said carrier means and said second of said vertical supporting members being located on the other side of said path of said carrier means, said. transport means translationally moving said elevator means along said horizontal member in said second direction.

4. The improvement of claim 3 further including finger means, coupled to said elevator means, for gripping one of said sample holders, said finger means, when said transport means moves said elevator means translationally along said member, moving in a third direction parallel to said second direction.

5. The improvement of claim 4 wherein said carrier means holds said two dimensional array of sample holders in rows and said finger means includes a plurality of fingers having an open and at least one closed configuration, said fingers, when in said open configuration, having a space between them in said plane greater than the dimension of said sample holders in said plane, and, when in said closed configuration, having a space between them about equal, in said plane, to the size, in said plane, of said sample holders, the minimum distance in a fourth direction perpendicular to said rows between said fingers, when in said open configuration, being greater than the dimension of said sample holder and the maximum distance between the exterior surfaces of said fingers in said fourth direction being no greater than the maximum distance between any two sample holders located in two rows separated from each other by a third row of sample holders, said fingers having additional portions of said exterior surfaces on both sides of the said exterior surfaces where said maximum distance between said exterior edges occurs, said additional portions having a distance between them less than said maximum distance.

6. The improvement of claim 5 including switching-control means, coupled to said transport means, said elevator means, and said finger means for, when said fingers, while at a third height, hold a first sample holder in said array at said first height on said line and said finger means are to grip a second sample holder on said line, placing said fingers in said open configuration and, while maintaining said fingers at said third height, causing said transport means to move said elevator means and said fingers until said fingers are located about said second sample holder, and placing said fingers in said closed configuration.

7. The improvement of claim 6 wherein said finger means include first and second fingers, said first finger being on one side of said line and said second finger being on the other side of said line, said first and second fingers, when said fingers move from said open configuration to said closed configuration, moving about an equal nonzero distance.

8. The improvement of claim 7 including spring means, coupled to said first and second fingers, for, when said fingers hold a sample holder, providing a sufficient force on said first and second fingers towards each other to hold said sample holder.

9. The improvement of claim 6 wherein said plane is a horizontal plane and said transport means includes height-control means, coupled to said elevator means and said finger means, for, prior to said finger means moving said fingers from said open configuration to said closed configuration about a sample holder in said plane, placing said fingers at said third height above said plane.

10. The improvement of claim 6 including sensing means, coupled to said finger means, for, when said fingers are not in said open configuration, determining whether a sample holder is between said fingers.

11. The improvement of claim 10 wherein said sensing means includes a single on-off detector.

12. The improvement of claim 10 wherein said switching-control means, when said fingers move from said open configuration to said closed configuration at a position on said line at said location of a sample holder in said two-dimensional array and said sensing means determines that a sample holder is not between said fingers, moves said fingers from said closed configuration to said open configuration and while said fingers remain at said third height, moves said fingers to a further location of a sample holder in said array on said line.

13. The improvement of claim 6 wherein said motive means includes preclude means, coupled to said transport means, said elevating means, and said finger means for preventing the movement of said fingers from a height above said third height to said third height when said fingers are (a) in said open configuration and (b) located above a sample holder having a location on a line connecting said two points.

14. The improvement of claim 6 wherein said finger means, said transport means, said elevator means, and said conveyor means transport each of said sample holders transported by said motive means from said carrier means moved by said conveyor means to a single position within said detector means.

15. The improvement of claim 14 further including select means for manually choosing the particular analyses to be performed upon particular sample holders held by said carrier means; memory means, coupled to said select means, for retaining information as to the particular analyses chosen on said select means for particular sample holders; and interface means coupled between (a) said memory means and (b) said detector means, said motive means and said conveyor means, for causing said conveyor means and said motive means to move each of said particular sample holders from said carrier means to said detector means and for causing said detector means to perform said particular analyses upon said particular sample holders.

16. The improvement of claim 15 further including coding means, coupled to said carrier means, for providing information regarding said sample holders and reading means, coupled to said memory means, for creating and transmitting to said memory means electronic signals indicative of the information provided by said coding means.

17. The improvement of claim 16 wherein said information relates to the size of said sample holders held by said carrier means, the number of said sample holders per unit area of said carrier means, or the type of activity to be performed upon the sample holders by said detector means.

18. The improvement of claim 15 wherein said carrier means is first carrier means, said conveyor means is first conveyor means, said two predetermined points are first and second predetermined points and said plane is a first plane; further including second carrier means for holding a two-dimensional array of a plurality of sample holders in a second plane and second conveyor means for moving said second carrier means along a second path in said predetermined first direction lying in said second plane so that all of said sample holders in said second carrier means pass between third and fourth predetermined points, said second carrier means, while being moved by said second conveyor means, remaining separated from said detector means and from said first carrier means by nonzero predetermined distances in said second plane; and wherein said transport means is separate from said second conveyor means and moves a sample holder having a location on a line connecting said third and fourth points and lying in said second plane and nonparallel to said first direction in said second direction from said location between said third and fourth points to said detector means.

19. The improvement of claim 18 wherein said particular analyses are a first set of particular analyses; said select means is also for manually choosing the particular analyses from a second set of analyses to be performed upon the sample holders held by said second carrier means; said control means is also coupled to said second conveyor means and, when said motive means has moved a sample holder from a location on a line connecting said third and fourth points to said detector means, said interface means causes said detector means to perform the analyses chosen from said second set of analyses for said sample holders from said second carrier means on said select means.

20. The improvement of claim 19 wherein said select means is also for choosing the order of said first and said second carrier means from which said motive means moves sample holders to said detector means; said memory means is for retaining information as to the order of said first and second carrier means chosen on said select means; and said interface means causes said motive means to move sample holders from said first and second carrier means in the order chosen on said select means.

21. The improvement of claim 15 wherein said memory means retains information as to the results of the analyses performed by said detector means and further including input-output means, coupled to said memory means, for transmitting to said memory means from an external source information similar to the information transmitted to said memory means from said select means and transmitting from said memory means to an external source information retained by said memory means.

22. The improvement of claim 4 wherein said finger means, said transport means, said elevator means, and said conveyor means will transport each of said sample holders transported by said motive means from said carrier means moved by said conveyor means to a single position within said detector means.

23. The improvement of claim 22 wherein said conveyor means contacts said carrier means at a single location along said path.

24. The improvement of claim 23 wherein said carrier means is first carrier means, and said array is a first array; further including second carrier means having at least one external dimension different from said first carrier means for holding a second two-dimensional array of a plurality of sample holders in a plane; and wherein said conveyor means moves said second carrier means along said path in said predetermined first direction so that all of said sample holders in said second carrier means pass between said two predetermined points.

25. The improvement of claim 23 including orientation-determining means, coupled to said carrier means and said conveyor means for, unless a predetermined portion of said carrier means is the first portion of said carrier means to pass between said two predetermined points, preventing said motive means from moving a sample holder from said carrier means to said detector means.

26. The improvement of claim 25 wherein said carrier means holds said two-dimensional array of sample holders in rows and has a generally rectangular external configuration and said orientation-determining means includes (a) a plurality of tabs connected to a particular side of the outer surface of said carrier means and with each of said tabs being located a predetermined distance away from one of said rows in said array, with one of said tabs being located said predetermined distance away from each of said rows, and (b) opto-sensors coupled to said detector means and positioned to detect said tabs when said conveyor means moves said carrier means with a predetermined side, which is not said particular side, first passing between said two points, said opto-sensor being located said predetermined distance away from said line connecting said predetermined two points and further including conveyor-controlling means, coupled to said opto-sensor and to said conveyor means, for, when said motive means is to move a particular sample holder in a particular row in said carrier means to said detector means, stopping said conveyor means from further moving said carrier means when said opto-sensor has detected the tab located said predetermined distance away from said particular row.

27. The improvement of claim 23 wherein said path is a substantially straight path and said carrier means is a first carrier means and said array is a first array and further including second carrier means for holding a second two-dimensional array of a plurality of sample holders in a plane and coupling means coupled to said first carrier means and to said second carrier means for linking said first and second carrier means and transmitting from said first carrier means to said second carrier means sufficient force to move said second carrier means.

28. The improvement of claim 27 further including (a) barrier means, located along said path on the side of said line connecting said two points in the direction in which said conveyor means moves said carrier means along said path, for preventing motion past a selected location on said path and (b) motion-detection means for determining when said conveyor means cannot move along said path the carrier means in contact with said conveyor means.

29. The improvement of claim 22 wherein said transport means moves said sample holder in a single dimension in the horizontal plane.

30. The improvement of claim 29 wherein said motive means further includes:

(A) linking means coupled to said elevator and said transport means, for coupling said elevator means to said transport means, said linking means including an elongated substantially rigid bar having cylindrical symmetry and following means, coupled to said elevator means, substantially surrounding said bar, and fitting snugly around said bar but being able to move translationally along said bar, said bar lying parallel to said second direction; and (B) orienting means having first and second parts, said first part being rigidly coupled to said bar and removed from said bar in a particular direction and said second part being rigidly coupled to said following means and in contact with said first part, said first and second parts being free to move relative to each other in said particular direction.

31. The improvement of claim 30 including positioning means, coupled to said transport means, for determining when said following means is at a predetermined position along said bar.

32. The improvement of claim 31 wherein said positioning means is a first positioning means and said elevator means moves said finger means between a third height and a fourth height, said finger means being at said third height when holding a sample holder at said first height and being at said fourth height when holding a sample holder at said second height and further including second and third positioning means, coupled to said elevator means, for determining when said finger means is at said third height and said fourth height, respectively.

33. The improvement of claim 22 wherein said detector means includes radiation-sensing means for performing a radiation analysis upon a sample holder located in a predetermined position in said detector means to determine a radioactive property of the sample in said sample holder and further including:

(A) ascertaining means for determining when no sample holder is in said predetermined position;
(B) initiating means, coupled to said detector means and to said ascertaining means, for periiodically causing said detector means to perform said radiation analysis when said ascertaining means has determined that no sample holder is in said predetermined position; and
(C) alarm means, coupled to said detector means and said ascertaining means, for, when said detector means has performed said analysis with no sample holder in said position and has determined a level of radioactivity above a predetermined level, providing a perceptible alarm 34. The improvement of claim 33 further including position-controlling means, coupled to said initiating means, said elevator means, and said transport means, for, prior to said initiating means causing said detector means to perform said analysis, causing said transport means and said elevator means to place said finger means in the position said finger means occupies when said finger means is holding a sample holder and said transport and said elevator means have moved said sample holder to said detector means.

35. The improvement of claim 22 wherein said detector means performs a standard analysis upon a sample holder to determine the value of a property of said sample holder and further including:

(A) a standard sample in a standard sample holder having a known value of said property;

(B) holding means, coupled to said instrument at a nonzero distance removed from said detector means, for retaining said standard sample holder in a fixed position; and (C) transfer means for moving said standard sample holder from said holding means to said detector means.

36. The improvement of claim 35 further including initiating means, coupled to said transfer means and to said detector means for automatically causing said transfer means to move said standard sample holder from said holding means to said detector means and to subsequently cause said detector means to perform said standard analysis upon said standard sample holder.

37. The improvement of claim 36 further including clock means coupled to said initiating means for keeping track of the time of day and wherein said initiating means causes said transfer means to move said standard sample holder from said holding means to said detector means and causes said detector means to automatically perform said standard analysis upon said standard sample holder at about a particular time of each day.

38. The improvement of claim 37 wherein said instrument operates upon electrical power and said transfer means comprises said motive means and further including inhibit means, coupled to said detector means and said motive means, for preventing said motive means from moving a sample holder from said carrier means to said detector means until, (1) for any analysis, after the initial application of power to said instrument and (2) after said particular time of day, for an analysis initiated after said particular time, said motive means has moved said standard sample holder from said holding means to said detector means and said detector means has performed said standard analysis on said standard sample holder.

39. The improvement of claim 38 wherein said detector means can perform a plurality of different analyses upon samples in said sample holders and further including (1) select means for manually choosing the particular analyses to be performed upon particular sample holders in said carrier means and (2) memory means, coupled to said select means, said motive means, and said detector means for:

(a) retaining information chosen on said select means concerning the particular analyses to be performed upon particular sample holders; and (b) when:

(i) particular analyses for particular sample holders have been chosen on said select means prior to the time said inhibit means prevents said motive means from moving said particular sample holders to said detector means and, subsequently, said inhibit means prevents said motive means from moving said particular sample holders to said detector means prior to running said particular analyses chosen on said select means; or (ii) said particular analyses are chosen on said select means during the time said inhibit means prevents said motive means from moving said particular sample holders to said detector means, then, after said motive means has moved said standard sample holder from said holding means to said detector means and said detector means has performed said standard analysis upon said standard sample holder, causing said motive means to move said particular sample holders to said detector means and causing said detector means to perform said particular analyses upon said particular sample holders.

40. The improvement of claim 39 wherein said detector means includes radiation-sensing means for performing a radiation analysis upon a sample holder located in a predetermined position in said detector means to determine a radioactive property of the sample in said sample holder and further including:

(A) ascertaining means for determining when no sample holder is in said predetermined position;

(B) initiating means, coupled to said detector means and to said ascertaining means, for periodically causing said detector means to perform said radiation analysis when said ascertaining means has determined that no sample is in said predetermined position; and (C) alarm means, coupled to said detector means and said ascertaining means, for, when said detector means has performed said analysis with no sample in said position and has determined a level of radioactivity above a predetermined level, providing a perceptible alarm.

41. The improvement of claim 40 further including position-controlling means, coupled to said initiating means, said elevator means, and said transport means for, prior to said initiating means causing said detector means to perform said analyses, causing said transport means and said elevator means to place said finger means in the position said finger means occupies when said finger means is holding a sample holder and said transport means and said elevator means have moved said sample holder to said detector means.

42. The improvement of claim 41 wherein said motive means, when moving one of said sample holders from said carrier means to said detector means, places said sample holder at said detector means at a place separated by a distance at least five times the width of said sample holder from the remaining sample holders in said carrier means while on said path.

43. The improvement of claim 22 including select means for manually choosing particular analyses to be performed upon particular sample holders in said carrier means, memory means, coupled to said select means, said motive means, and said detecting means, for retaining information as to the analyses chosen on said select means, counting means, coupled to said motive means, for determining the number of tubes held by said carrier means, and alarm means, coupled to said counting means and to said memory means, for providing a perceptible alarm when said carrier means holds less sample holders than required by the analyses chosen on said select means for the sample holders in said carrier means.

44. The improvement of claim 43 wherein said counting means further includes (a) sensing means, coupled to said finger means, for, when said fingers are not in said open configuration, determining whether a sample holder is between them and (b) starting means, coupled to said conveyor means, for, after said motive means has moved to said detector means all of said particular sample holders for which said particular analyses have been chosen on said select means, causing said conveyor means to move said carrier means along said path past until no portion of said carrier means remains between said two points.

45. The improvement of claim 43 wherein said memory means retains messages to be displayed at particular times and the times at which said messages are to be displayed and further including clock means for keeping track of the time of the day and the day of the year, display means, coupled to said clock means and said memory means, for providing a display of said messages at said particular times.

46. The improvement of claim 43 wherein said detector means can perform a plurality of analyses upon a sample holder and wherein said select means is for manually choosing a particular analysis to be performed upon a particular sample holder and further including:
   (a) storage means, coupled to said select means and to said detector means, for accumulating information about the analyses performed by said detector means;
   (b) output means, coupled to said storage means, for, upon the receipt of an electronic signal of a particular type, providing as a perceptible output said information about the analyses performed by said detector means; and
   (c) manually actuable signalling means coupled to said output means, for providing said signal of said particular type to said output means.

47. The improvement of claim 43 further including display means, coupled to said select means and to said memory means, for providing a temporary display of information concerning the analyses performed by said detector means; printing means, coupled to said memory means, for providing a permanent display of information concerning the results of the analyses performed by said detector means; and control means, coupled to said motive means, said detector means, said printing means, said display means, and said select means for permitting the operation of said select means and display means regardless of the functions being performed by said detector means, said motive means, or said printing means.

48. The improvement of claim 4 wherein said motive means, when moving one of said sample holders from said carrier means to said detector means, places said sample holder at said detector means at a place separated by a distance at least five times the width of said sample holder from the remaining sample holders in said carrier means. while on said path.

49. The improvement of claim 4 wherein said transport means moves said sample holder in a single dimension in the horizontal plane.

50. The improvement of claim 49 wherein said motive means further includes:
   (A) linking means, coupled to said elevator and said transport means, for coupling said elevator means to said transport means, said linking means including an elongated substantially rigid bar having cylindrical symmetry and following means, coupled to said elevator means, substantially surrounding said bar, and fitting snugly around said bar but being able to move translationally along said bar, said bar lying parallel to said second direction; and
   (B) orienting means having first and second parts, said first part being rigidly coupled to said bar and removed from said bar in a particular direction and said second part being rigidly coupled to said following means and in contact with said first part, said first and second parts being free to move relative to each other in said particular direction.

51. The improvement of claim 50 including positioning means, coupled to said transport means, for determinig when said following means is at a predetermined position along said bar.

52. The improvement of claim 51 wherein said positioning means is a first positioning means and said elevator means moves said finger means between a third height and a fourth height, said finger means being at said third height when holding a sample holder at said first height and being at said fourth height when holding a sample holder at said second height and further including second and third positioning means, coupled to said elevator means, for determining when said finger means is at said third height and said fourth height, respectively.

53. The improvement of claim 4 wherein said carrier means is first carrier means, said conveyor means is first conveyor means, said two predetermined points are first and second predetermined points and said plane is a first plane; further including second carrier means for holding a two-dimensional array of a plurality of sample holders in a second plane and second conveyor means for moving said second carrier means along a second path in said predetermined first direction lying in said second plane so that all of said sample holders in said second carrier means pass between third and fourth predetermined points, said second carrier means, while being moved by said second conveyor means, remaining separated from said detector means and from said first carrier means by nonzero predeterminned distances in said second plane; and wherein said transport means is separate from said second conveyor means and moves a sample holder having a location on a line connecting said third and fourth points and lying in said second plane and nonparallel to said first direction in said second direction from said location between said third and fourth points to said detector means.

54. The improvement of claim 53 further including select means for manually choosing the particular analyses to be performed upon particular sample holders held by said first and second carrier means; memory means, coupled to said select means, for retaining information as to said particular analyses chosen on said select means for particular sample holders held by said first and second carrier means; and interface means coupled between (a) said memory means and (b) said detector means, said motive means and said first and second conveyor means, for causing said first and second conveyor means and said motive means to move each of said particular sample holders from said first and second carrier means to said detector means and for causing said detector means to perform said particular analyses upon said particular sample holders from said first and second carrier means.

55. The improvement of claim 54 wherein said particular analyses include a first set and a second set of particular analyses; said select means is for manually choosing the particular analyses from said first set to be performed upon said sample holders held by said first carrier means and the particular analyses from said second set to be performed upon the sample holders held by said second carrier means; and, when said motive means has moved a sample holder from (a) a location on a line connecting said first and second points to said detector means said control means causes said detector means to perform the particular analyses chosen from said first analyses for said sample holders from said first carrier means on said select means and (b) a location on a line connecting said third and fourth points to said detector means, said control means causes said detector means to perform the particular analyses chosen from said second set of analyses for said sample holders from said second carrier means on said select means.

56. The improvement of claim 55 wherein said select means is also for choosing the order of said first and said second carrier means from which said motive means moves sample holders to said detector means, said memory means is for retaining information as to the order of said first and second carrier means chosen on said select means, and said interface means causes said motive means to move sample holders from said first and second carrier means in the order chosen on said select means.

57. The improvement of claim 56 wherein said finger means, said transport means, said elevator means, and said first and second conveyor means transport each of said sample holders transported by said first and second conveyor means to a single position within said detector means.

58. In an instrument having radiation-sensing detector means for performing an analysis upon a sample in a sample holder located in a predetermined position to determine a radioactive property of said sample, the improvement comprising:
 (A) ascertaining means, coupled to said position, for determining when no sample holder is in said position for said detector means to perform said analysis upon;
 (B) initiating means, coupled to said ascertaining means, for periodically causing said detector means to perform said analysis when said ascertaining means has determined that no sample holder is in said position; and
 (C) alarm means, coupled to said detector means and to said ascertaining means, for when said detector means has performed said analysis with no sample holder in said position and said detector means has determined a level of activity above a predetermined level, providing a perceptible alarm.

59. The improvement of claim 58 including:
 (A) carrier means for holding a two-dimensional array of a plurality of samples in a plane;
 (B) conveyor means for moving said carrier means along a path in a predetermined first direction lying in said plane so that all of said samples in said carrier means pass between two predetermined points, said carrier means, while being moved by said conveyor means, remaining separated from said detector means by at least a nonzero predetermined distance in said plane;
 (C) motive means, separate from said conveyor means, for moving a sample having a location on a line connecting said two points and lying in said plane and nonparallel to said first direction in a second direction from said location to said detector means, said second direction, in said plane, having a nonzero component of motion nonparallel to said first direction, said motive means including:
  (1) transport means for moving said sample horizontally in said second direction;
  (2) elevator means, coupled to said transport means, for lifting a sample having a first height in said plane to a second height above said plane; and
  (3) finger means, coupled to said elevator means, for gripping one of said samples; and
 (D) position-controlling means, coupled to said initiating means, said elevator means, and said transport means, for, prior to said initiating means causing said detector means to perform said analysis, causing said transport means and said elevator means to place said finger means in the position said finger means occupies when said finger means is holding a sample and said transport and said elevator means have moved said sample to said detector means.

60. In an instrument having:
 (1) detector means having a plurality of conditions for performing one of a plurality of analyses upon a sample contained in a sample holder at a predetermined location, the analyses performed by said detector means when in one of said conditions being different than the analyses performed by said detector when in another of said conditions;
 (2) control means, coupled to said detector means, for placing said detector means in one of said conditions for performing one of said predetermined analyses;
 (3) calculating means, coupled to said detector means, for processing signals developed by said detector means during an analysis and providing an output indicative of the result of the analysis performed by said detector means;
 (4) location means for holding a plurality of sample holders;
 (5) motive means for moving each of said sample holders in said location means to the said detector means;
the improvement comprising:
 (A) select means for manually choosing the analyses to be performed upon said sample holders in said storage means;
 (B) memory means, coupled to said select means, said calculating means, and said control means, for retaining and providing to said control means and said calculating means the information required for said detector means to perform any one of said analyses and said calculating means to perform the calculations for the analyses performed;
 (C) responding means, coupled to said select means, said motive means, said control means, and said calculating means, for selectively inducing (i) said motive means to move each of said sample holders from said location means to said detector means and, after the performance of an analysis on a specific sample holder, to return said specific sample holder to said location means, (ii) said control means to place said detector means in the appropriate condition for the analyses chosen on said select means; and (iii) said calculating means, after said detector means has performed said analyses, to calculate the results of the analysis for each of the said plurality of selected analyses for said sample holders;
 (D) machine readable coding means, coupled to said location means, for providing information regarding said sample holders; and
 (E) reading means, coupled to said memory means, for creating and transmitting to said memory means electronic signals indicative of the information provided by said coding means.

61. The improvement of claim 60 wherein said information relates to the size of said sample holders held by said location means, the number of said sample holders per unit area of said location means, or the type of activity to be performed upon the sample holders by said detector means.

62. The improvement of claim 60 wherein said location means includes first and second carrier means, and further comprising:
(A) first and second conveyor means for moving said first and second carrier means along first and second paths, respectively, in predetermined first and second directions, respectively, lying in said plane so that all of said sample holders in said first and second carrier means, pass, respectively, between first and second predetermined points, and third and fourth predetermined points, said carrier means, while being moved by said first and second conveyor means, remaining separated from said detector means by at least nonzero first and second predetermined distance, respectively, in said plane; and
(B) motive means, separate from said first and second means, for moving a sample holder having a location on a line connecting said first and second points or said third and fourth points and lying in said plane and nonparallel to said first direction in a second direction from said location to said detector means, said second direction, in said plane, having a nonzero component of motion nonparallel to said first direction.

63. The improvement of claim 62 wherein said analyses include first and second sets of analyses; said select means is for manually choosing the analyses from said first and second sets of analyses to be performed upon the sample holders held by said first and second carrier means, respectively, and said control means is also coupled to said first and second conveyor means, respectively, and, when said motive means has moved a sample holder from a location on a first line connecting first and second points or on a second line connecting said third and fourth points to said detector means, said control means causes said detector means to perform the analyses from said first or second sets, respectively, of analyses for said sample holders from said first and second carrier means, respectively, on said select means.

64. The improvement of claim 63 wherein said select means is also for choosing the order of said first and said second carrier means from which said motive means moves sample holders to said detector means; said memory means is for retaining information as to the order of said first and second carrier means chosen on said select means; and said responding means causes said motive means to move sample holders from said first and second carrier means in the order chosen on said select means.

65. The improvement of claim 60 wherein said detector means performs a standard analysis upon a sample holder to determine the value of a property of said sample holder and further including:
(A) a standard sample in a standard sample holder having a known value of said property;
(B) holding means, coupled to said instrument at a nonzero distance removed from said detector means, for retaining said standard sample holder in a fixed position; and
(C) transfer means for moving said standard sample holder from said holding means to said detector means.

66. The improvement of claim 65 further including initiating means, coupled to said transfer means and to said detector means for automatically causing said transfer means to move said standard sample holder from said holding means to said detector means and to subsequently cause said detector means to perform said standard analysis upon said standard sample holder.

67. The improvement of claim 66 further including clock means coupled to said initiating means for keeping track of the time of day and wherein said initiating means causes said transfer means to move said standard sample holder from said holding to said detector means and causes said detector means to automatically perform said standard analysis upon said standard sample holder at about the same time of each day.

68. The improvement of claim 67 wherein said instrument operates upon electrical power and said transfer means comprises said motive means and further including inhibit means, coupled to said detector means and said motive means, for preventing said motive means from moving a sample holder from said carrier means to said detector means until, (1) for any analysis, after the initial application of power to said instrument and (2) after said particular time of day, for an analysis initiated after said particular time, said motive means has moved said standard sample holder from said holding means to said detector means and said detector means has performed said standard analysis on said standard sample holder.

69. The improvement of claim 66 wherein said detector means can perform a plurality of analyses upon a sample holder and wherein said select means is for manually choosing a particular analysis to be performed upon a particular sample holder and further including:
(a) storage means, coupled to said select means and to said detector means, for accumulating information about the analyses performed by said detector means;
(b) output means, coupled to said storage means, for, upon the receipt of an electronic signal of a particular type, providing as a perceptible output of said information about the analyses performed by said detector means; and
(c) manually actuable signalling means, coupled to said output means, for providing said signal of said particular type to said output means.

70. The improvement of claim 60 wherein said location means holds said sample holders in a two-dimensional array in rows and further including:
(A) carrier means for holding a two-dimensional array of a plurality of said sample holders in a plane;
(B) conveyor means for moving said carrier means along a path in a predetermined first direction lying in said plane so that all of said sample holders in said carrier means pass between two predetermined points, said carrier means, remaining separated from said detector means by at least a nonzero predetermined distance in said plane;
(C) motive means, separate from said conveyor means, for moving a sample holder having a location on a line connecting said two points and lying in said plane and nonparallel to said first direction to said detector means, said second direction, in said plane, having a nonzero component of motion nonparallel to said first direction, said motive means including:
(1) transport means for moving said sample holder horizontally in said second direction;
(2) elevator means, coupled to said transport means, for lifting a sample holder having a first height in said plane to a second height above said plane; and (3) finger means, coupled to said elevator means, for gripping one of said samples and including a plurality of fingers having an open and at least one closed configuration, said fingers, when in said open configuration, having a space between them in said plane greater than the dimension of said sample holders in said plane, and, when in said closed configuration, having a space between them about equal, in said plane, of said sample holders, the minimum distance in a third direction perpendicular to said rows between said fingers, when in said open configuration, being greater than the dimension of said sample holder and the maximum distance between the exterior surfaces of said fingers in said third direction being no greater than the maximum distance between any two sample holders located in two rows separated from each other by a third row of sample holders, said fingers having additional portions of said exterior surfaces, on both sides of the said exterior surfaces where said maximum distance between said exterior edges occurs, said additional portions having a distance between them less than said maximum distance.

71. The improvement of claim 70 including switching-control means, coupled to said transport means, said elevator means, and said finger means for, when said fingers, while at a third height, hold a first sample holder in said array at said first height on said line and said finger means are to grip a second sample holder on said line, placing said fingers in said open configuration and, while maintaining said fingers at said third height, causing said transport means to move said elevator means and said fingers until said fingers are located about said second sample holder, and placing said fingers in said closed configuration.

72. The improvement of claim 71 wherein said finger means include first and second fingers, said first finger being on one side of said line and said second finger being on the other side of said line, said first and second fingers, when said fingers move from said open configuration to said closed configuration, moving about an equal nonzero distance.

73. The improvement of claim 72 including spring means, coupled to said first and second fingers, for, when said fingers hold a sample holder, providing a sufficient force on said first and second fingers towards each other to hold said sample holder.

74. The improvement of claim 73 wherein said plane is a horizontal plane and said transport means includes height-control means, coupled to said elevator means and said finger means, for, prior to said finger means moving said fingers from said open configuration to said closed configuration about a sample holder in said plane, placing said fingers at said third height above said plane.

75. The improvement of claim 74 inlcuding sensing means, coupled to said finger means, for, when said fingers are not in said open configuration, determining whether a sample holder is between said fingers.

76. The improvement of claim 75 wherein said sensing means includes a single on-off detector.

77. The improvement of claim 76 wherein said fingers hava a plurality of different gripping closed configurations in which a sample holder is in said fingers and said spring means applies substantially the same pressure on said fingers in the direction to close said fingers when said fingers are in any of said different gripping closed configurations.

78. The improvement of claim 77 wherein said fingers have at least two of said different gripping closed configurations in which the only force exerted on said fingers by said finger means is exerted by said spring means and in which said fingers are sufficiently separated from each other to grip a sample holder, the distance by which said fingers are separated from each other being different in each of said different gripping closed configurations.

79. The improvement of claim 60 further including:
(a) storage means, coupled to said select means and to said detector means, for accumulating information about the analyses performed by said detector means;
(b) output means, coupled to said storage means, for, upon the receipt of an electronic signal of a particular type, providing as a perceptible output said information about the analyses performed by said detector means; and
(c) manually actuable signalling means, coupled to said output means, for providing said signal of said particular type to said output means.

80. In an analytical instrument having detector means for performing one of a plurality of analyses upon a sample, the improvement comprising:
(A) select means for manually choosing the particular analysis to be performed upon a particular sample;
(B) storage means, coupled to said select means and to said detector means, for accumulating information about the particular analyses performed by said detector means aside from the results of said analyses;
(C) output means, coupled to said storage means, for upon the receipt of an electronic signal of a particular type, providing, as a perceptible output, a temporary display of said information about the analyses performed by said detector means;
(D) manually actuable signalling means, coupled to said output means, for providing said signals of said particular type to said output means;
(E) motive means for moving a sample tube towards and away from said detector means;
(F) printing means, coupled to said storage means, for providing a permanent display of information concerning the results of the analyses performed by said detector means; and
(G) control means coupled to said motive means, said detector means, said printing means, said output means, and said select means for permitting the operation of said select means and output means regardless of the functions being performed by said detector means, said motive means, or said printing means.

81. The improvement of claim 80 wherein said storage means retains messages to be displayed at particular times and the times at which said messages are to be displayed and further including clock means for keeping track of the time of the day and the day of the year and display means, coupled to said clock means and said memory means, for providing a display of said messages at said particular times.

82. The improvement of claim 80 further including:
(A) carrier means for holding a two-dimensional array of a plurality of samples in a plane; and (B) conveyor means for moving said carrier means along a path in a predetermined first direction lying in said plane so that all of said samples in said carrier means pass between two predetermined points, said carrier means, while being moved by said conveyor means, remaining separated from said detector means by at least a nonzero predetermined distance in said plane, and wherein said motive means is separate from said conveyor means, and moves a sample having a location on a line connecting said two points, lying in said plane and parallel to said first direction in a second direction from said location to said detector means, said second direction, in said plane, having a nonzero component of motion nonparallel to said first direction.

83. The improvement of claim 82 wherein said information relates to the number of each of said analyses performed by said detector means.

84. In an analytical instrument having detector means for performing analyses upon a sample contained in a sample holder, the improvement comprising:
   (A) carrier means for holding an array of a plurality of sample holders;
   (B) conveyor means for moving said carrier means along a path in a predetermined direction so that all of said sample holders in said carrier pass between two predetermined points;
   (C) machine readable positioning means, coupled to said carrier means, having a plurality of components coupled to said carrier means for indicating the position of said sample holders along at least one direction; and
   (D) sensing means, coupled to said detector means, for providing an indication of when the position of each of said components of said positioning means has reached a predetermined location relative to said detector means.

85. The improvement of claim 84 further including (1) motive means, separate from said conveyor means and coupled with said detector means, for moving a sample holder from a location between said two points from said carrier means to said detector means and back to said carrier means and (2) orientation-determining means, coupled to said carrier means and said conveyor means for, unless a predetermined portion of said carrier means is the first portion of said carrier means to pass between said two predetermined points, preventing said motive means from moving a sample holder from said carrier means to said detector means.

86. The improvement of claim 85 wherein said carrier means holds said sample holders in rows in a two-dimensional array in a plane including said direction and has a generally rectangular external configuration and said orientation-determining means includes (a) a plurality of tabs connected to a particular side of the outer surface of said carrier means with each of said tabs being located a predetermined distance away from one of said rows in said array, with one of said tabs being located said predetermined distance away from each of said rows, and (b) opto-sensors coupled to said detector means and positioned to detect said tabs when said conveyor means moves said carrier means with a predetermined side, which is not said particular side, first passing between said two points, said opto-sensor being located said predetermined distance away from said line connecting said predetermined two points and further including conveyor-controlling means, coupled to said opto-sensor and to said conveyor means, for, when said motive means is to move a particular sample holder in a particular row in said carrier means to said detector means, stopping said conveyor means from further moving said carrier means when said opto-sensor has detected the tab located said predetermined distance away from said particular row.

87. The improvement of claim 86 wherein said carrier means is first carrier means, and said array is a first array; further including second carrier means having at least one external dimension different from said first carrier means for holding a second two-dimensional array of a plurality of sample holders in a plane; and wherein said conveyor means moves said second carrier means along said path in said predetermined first direction so that all of said sample holders in said second carrier means pass between said two predetermined points.

88. The improvement of claim 87 wherein said direction is a first direction, said motive means moves a sample holder in a second direction having, in said plane, a nonzero component of motion nonparallel to said first direction and includes (1) transport means for moving said sample holder horizontally in said second direction; (2) elevator means, coupled to said transport means, for lifting a sample holder having a first height in said plane to a second height above said plane; and (3) finger means, coupled to said elevator means, for gripping one of said samples, said finger means including a plurality of fingers having an open and at least one closed configuration, said fingers, when in said open configuration, having a space between them in said plane greater than the dimension of said sample holders in said plane, and, when in said closed configuration, having a space between them about equal, in said plane, to the size, in said plane, of said sample holders, the minimum distance in a third direction perpendicular to said rows between said fingers, when in said open configuration, being greater than the dimension of said sample holder and the maximum distance between the exterior surfaces of said fingers in said third direction being no greater than the maximum distance between any two sample holders located in two rows separated from each other by a third row of sample holders, said fingers having additional portions of said exterior surfaces on both sides of the said exterior surfaces where said maximum distance between said exterior edges occurs, said additional portions having a distance between them less than said maximum distance.

89. The improvement of claim 88 including switching-control means, coupled to said transport means, said elevator means, and said finger means for, when said fingers, while at a third height, hold a first sample holder in said array at said first height on a line between said two points and said finger means are to grip a second sample holder on said line, placing said fingers in said open configuration and, while maintaining said fingers at said third height, causing said transport means to move said elevator means and said fingers until said fingers are located about said second sample holder, and placing said fingers in said closed configuration.

90. The improvement of claim 89 wherein said finger means include first and second fingers, said first finger being on one side of said line and said second finger being on the other side of said line, said first and second fingers, when said fingers move from said open configuration to said closed configuration, moving about an equal nonzero distance.

91. The improvement of claim 90 including spring means, coupled to said first and second fingers, for, when said fingers hold a sample holder, providing a sufficient force on said first and second fingers towards each other to hold said sample holder.

92. The improvement of claim 91 wherein said plane is a horizontal plane and said transport means includes height-control means, coupled to said elevator means and said finger means, for, prior to said finger means moving said fingers from said open configuration to said closed configuration about a sample holder in said plane, placing said fingers at said third height above said plane.

93. The improvement of claim 84 further including select means for manually choosing the particular analyses to be performed upon particular sample holders held by said carrier means; memory means, coupled to said select means, for retaining information as to the particular analyses chosen on said select means for particular sample holders; and interface means coupled between (a) said memory means and (b) said detector means, said motive means and said conveyor means, for causing said conveyor means and said motive means to move each of said particular sample holders from said carrier means to said detector means and for causing said detector means to perform said particular analyses upon said particular sample holders.

94. In an analytical instrument having detector means for performing analyses upon samples contained in sample holders, the improvement comprising:
(A) carrier means for holding a two-dimensional array of a plurality of sample holders in rows in a plane;
(B) a plurality of fingers for holding one of said sample holders and having an open and at least one closed configuration, said fingers, when in said open configuration, having a space between them in said plane greater than the dimension of said sample holders in said plane, and, when in said closed configuration, having a space between them about equal, in said plane, to the size, in said plane, of said sample holders, the minimum distance in a direction perpendicular to said rows between said fingers, when in said open configuration, being greater than the dimension of said sample holder and the maximum distance between the exterior surfaces of said fingers parallel to said direction being no greater than the maximum distance between any two sample holders located in two rows separated from each other by a third row of sample holders;
(C) closing means, coupled to said fingers, for moving said fingers between said open and closed positions and, with said finger means in said closed position and with a sample holder situated between said fingers, applying pressure on said fingers towards each other; and
(D) moving means for:
(1) when said fingers are in said open position, placing said fingers at a first height around at least a portion of a particular sample holder;
(2) when said fingers have moved to said closed position around said particular sample holder, lifting said fingers to a second height sufficiently above said first height to remove said particular sample holder from said carrier means to a second position;
(3) transporting said particular sample holder to said detector means from said second position;
(4) returning said particular sample holder from said detector means to said second position;
(5) lowering said particular sample holder from said second position to said first position;
(6) after lowering said particular sample holder to said first position, placing said fingers in said open configuration; and
(7) while said finger means are in said open position and at said first height, moving said finger means from around said particular sample holder to around a different sample holder.

95. The improvement of claim 94 said fingers have additional portions of said exterior surfaces on both sides of the said exterior surfaces where said maximum distance between said exterior edges occurs, said additional portions having a distance between them less than said maximum distance.

96. The improvement of claim 95 including preclude means, coupled to said moving means, said closing means, and said fingers, for preventing the movement of said fingers from a height above said first height to said first height when said fingers are (a) in said open configuration and (b) located above a sample holder located in said carrier means.

97. The improvement of claim 96 wherein said fingers include first and second fingers, which, when said fingers move from said open configuration to said closed configuration, move about an equal nonzero distance.

98. The improvement of claim 97 including spring means, coupled to said first and second fingers, for, when said fingers hold a sample holder, providing a sufficient force on said first and second fingers towards each other to hold said sample holder.

99. The improvement of claim 98 wherein said plane is a horizontal plane and further including height-control means, coupled to said moving means, said closing means, and said fingers, for, prior to said closing means moving said fingers from said open configuration to said closed configuration about a sample holder in said plane, placing said fingers at said first height above said plane.

100. The improvement of claim 99 including sensing means, coupled to said fingers, for, when said fingers are not in said open configuration, determining whether a sample holder is between said fingers.

101. The improvement of claim 100 wherein said fingers have a plurality of different gripping closed configurations in which a sample holder is in said fingers and said spring means applies substantially the same pressure on said fingers in the direction to close said fingers when said fingers are in any of said different gripping closed configurations.

102. The improvement of claim 101 wherein said fingers have at least two of said different gripping closed configurations in which the only force exerted on said fingers by said finger means is exerted by said spring means and in which said fingers are sufficiently separated from each other to grip a sample holder, the distance by which said fingers are separated from each other being different in each of said different gripping closed configurations.

103. The improvement of claim 100 wherein said moving means comprises:
(A) conveyor means for moving said carrier means along a path in a predetermined first direction lying in said plane so that all of said sample holders in said carrier means pass between two predetermined points, said carrier means, while being moved by said conveyor means, remaining separated from said detector means by at least a nonzero predetermined distance in said plane; and (B) motive means, separate from said conveyor means, for moving a sample holder having a location on a line connecting said two points, lying in said plane and nonparallel to said first direction in a second direction from said location to said detector means, said second direction, in said plane, having a nonzero component of motion nonparallel to said first direction.

* * * * *